United States Patent
Horii et al.

(10) Patent No.: US 7,507,898 B2
(45) Date of Patent: Mar. 24, 2009

(54) MUSIC REPRODUCTION DEVICE, METHOD, STORAGE MEDIUM, AND INTEGRATED CIRCUIT

(75) Inventors: Noriaki Horii, Osaka (JP); Keiji Icho, Osaka (JP); Masayuki Misaki, Hyogo (JP); Junichi Tagawa, Kyoto (JP); Hiroaki Yamane, Osaka (JP)

(73) Assignee: Panasonic Corporation, Osaka (JP)

( * ) Notice: Subject to any disclaimer, the term of this patent is extended or adjusted under 35 U.S.C. 154(b) by 2 days.

(21) Appl. No.: 11/793,198

(22) PCT Filed: Nov. 1, 2005

(86) PCT No.: PCT/JP2005/020079

§ 371 (c)(1),
(2), (4) Date: Jun. 18, 2007

(87) PCT Pub. No.: WO2006/075432

PCT Pub. Date: Jul. 20, 2006

(65) Prior Publication Data

US 2008/0072740 A1 Mar. 27, 2008

(30) Foreign Application Priority Data

Jan. 17, 2005 (JP) .............................. 2005-009562

(51) Int. Cl.
*A63H 5/00* (2006.01)
*G04B 13/00* (2006.01)
*G10H 7/00* (2006.01)

(52) U.S. Cl. .............................. 84/609; 84/610; 84/615; 84/634; 84/649; 84/650; 84/666

(58) Field of Classification Search ................... None
See application file for complete search history.

(56) References Cited

U.S. PATENT DOCUMENTS 5,995,084 A 11/1999 Chan et al.
7,022,905 B1 * 4/2006 Hinman et al. ................ 84/609

(Continued)

FOREIGN PATENT DOCUMENTS

| JP | 2002-073041 | 3/2002 |
| JP | 2003-272281 | 9/2003 |
| WO | 97/33424 | 9/1997 |
| WO | 03/019560 | 3/2003 |

*Primary Examiner*—Marlon T Fletcher
(74) *Attorney, Agent, or Firm*—Wenderoth, Lind & Ponack, L.L.P.

(57) ABSTRACT

An operational information obtaining section of a music reproduction device obtains operational information which corresponds to a user's operation and represents an instruction on an action of a reproduction section for reproducing data of a musical composition. A selection condition calculation section changes, during the musical composition being reproduced by the reproduction section, relative merits of attribute information relating to the data of the musical composition in accordance with details of the operational information obtained by the operational information obtaining section, and then calculates, based on the relative merits of the attribute information, a condition for selecting the data of the musical composition to be reproduced by the reproduction section. The relative merits of the attribute information, which is information relating to the data of the musical composition, is changed in accordance with the user's operational information, and selection is performed in accordance with the relative merits of the attribute information, whereby it is possible, with the user's simple operation, to reproduce only the musical composition which is desired to be listened to.

13 Claims, 12 Drawing Sheets

U.S. PATENT DOCUMENTS 7,199,300 B2 * 4/2007 Kodama et al. ............... 84/601
7,202,408 B2 * 4/2007 Fallgatter ..................... 84/645
7,368,652 B2 * 5/2008 Iketani et al. ................. 84/609

* cited by examiner

F I G. 4

| ATTRIBUTE INFORMATION | | WEIGHTING FACTOR |
|---|---|---|
| TEMPO | SLOW | 1 0 |
| | NORMAL | 1 0 |
| | FAST | 1 0 |
| BEAT | 2 BEAT | 1 0 |
| | 4 BEAT | 1 0 |
| | 8 BEAT | 1 0 |
| | 16 BEAT | 1 0 |
| VOCALIST | FEMALE | 1 0 |
| | MALE | 1 0 |

F I G. 5

| ATTRIBUTE INFORMATION | | WEIGHTING FACTOR |
|---|---|---|
| TEMPO | SLOW | 9 |
| | NORMAL | 10 |
| | FAST | 10 |
| BEAT | 2 BEAT | 10 |
| | 4 BEAT | 9 |
| | 8 BEAT | 10 |
| | 16 BEAT | 10 |
| VOCALIST | FEMALE | 10 |
| | MALE | 8 |

FIG. 6

| ATTRIBUTE INFORMATION || WEIGHTING FACTOR |
|---|---|---|
| TEMPO | SLOW | 9 |
| | NORMAL | 1 0 |
| | FAST | 1 1 |
| BEAT | 2 BEAT | 1 0 |
| | 4 BEAT | 9 |
| | 8 BEAT | 1 0 |
| | 16 BEAT | 1 1 |
| VOCALIST | FEMALE | 1 1 |
| | MALE | 8 |

FIG. 7

| ATTRIBUTE INFORMATION || WEIGHTING FACTOR |
|---|---|---|
| TEMPO | SLOW | 1 1 |
| | NORMAL | 1 1 |
| | FAST | 1 5 |
| BEAT | 2 BEAT | 9 |
| | 4 BEAT | 1 0 |
| | 8 BEAT | 1 4 |
| | 16 BEAT | 1 4 |
| VOCALIST | FEMALE | 1 5 |
| | MALE | 1 1 |

MUSIC REPRODUCTION DEVICE, METHOD, STORAGE MEDIUM, AND INTEGRATED CIRCUIT

TECHNICAL FIELD OF THE INVENTION

The present invention relates to a music reproduction device, a method, a storage medium, and an integrated circuit which continuously reproduce a musical composition selected from data of a plurality of stored musical compositions.

BACKGROUND ART OF THE INVENTION

Conventionally, as is represented by an optical disc such as a DVD (Digital Versatile Disc) and a hard disc, an information storage medium having a large capacity is being developed. For example, in the case of a CD (Compact Disk), an available data storage capacity is 650 MB, but in the case of the DVD, 4.7 GB data can be stored on one side thereof, and a further high-density optical disc which uses blue laser is also being developed. Further, with regard to the hard disc, a 1.8 inch disc having a data capacity of 40 GB has also been developed, which is used as a portable type information storage medium to be mounted in a portable music reproduction device and the like.

On the other hand, various types of irreversible voice compression storage methods, as represented by MP3 (MPEG Audio Layer-3), have been developed recently, and data of musical compositions may be stored by using the storage methods. For example, in the case where data of a 5-minute musical composition is stored by using MP3 of 128 kbps, a data amount thereof will be approximately 5 MB. Here, in the case of the data of the 5-minute musical composition in a CD (44.1 kHz/16 bits/2 ch), a data amount thereof will be approximately 50 MB, and if the irreversible voice compression method such as the MP3 is used, the data amount will be reduced by approximately a tenth. As a result, it becomes possible to store a large amount of data of the musical compositions on the information storage medium such as the optical disc, and consequently a user can reproduce a musical composition by selecting from the data of the musical compositions stored in large quantities.

As a method of performing continuous reproduction by selecting from a plurality of musical compositions, there is a method where a one-by-one selection of desired musical compositions by the user, a selection using bibliographic information such as an artist name and a category name, a selection based on a play list which describes the plurality of the musical compositions and is previously edited by the user, or a random selection which causes a reproduction device to select the musical compositions at random, etc. is performed, and then data of a selected musical composition is reproduced continuously. Further, a method is disclosed (for example, patent document 1), where a feature level and the bibliographic information of each of the plurality of the musical compositions are extracted previously, and if a selection condition relating to an order of the musical compositions to be reproduced by the user is inputted, the data of the musical composition having the feature level and the bibliographic information, which satisfy the selection condition, assigned thereto is selected.

[Patent Document 1: Japanese Laid-Open Patent Publication No. 2002-73041

However, according to an conventional selection method as above described, it is difficult for a user, when selecting from a plurality of the musical compositions and reproducing a piece of music, to reproduce only a musical composition which is desired to be listened to, without effort. For example, in the case of a selection based on a play list previously prepared or a random selection, it is difficult for the user to reproduce only the musical composition which is desired to be listened to at an actual moment. Further, it requires large efforts for the user to select the musical compositions one by one from a large amount of data of stored musical compositions, and thus it is not realistic in a circumstance where the user has difficulty with a complicated operation, such as a case of a vehicle-installed device, or where an input interface has restrictions, such as a case of a portable-type music reproduction device. Further, even in the case of the selection method disclosed in the above-described patent document 1, the user is required to input a selection condition which indicates an order of the musical compositions, thereby requiring large efforts as with a case of selecting the musical compositions one by one.

Therefore, an object of the present invention is to provide a music reproduction device, a method, a storage medium, and an integrated circuit which select, from the plurality of the musical compositions, the user's desired musical composition with a simple operation.

To achieve the above object, the present invention has aspects as described below.

A first aspect is a music reproduction device for reproducing data of a musical composition selected from a plurality of musical compositions. The music reproduction device comprises a musical composition data storage section, an attribute information storage section, a reproduction section, an operational information obtaining section, and a control section. The music composition data storage section stores data of the plurality of the musical compositions. The attribute information storage section stores attribute information, which is information relating to the data of the musical composition, on each of the data of the plurality of the musical compositions which are stored on the musical composition data storage section. The reproduction section reproduces the data of the musical composition stored on the musical composition data storage section. The operational information obtaining section obtains operational information corresponding to a user's operation which represents an instruction on an action of the reproducing section. The control section selects the data of the musical composition to be reproduced by the reproducing section. The control section includes a selection condition calculation section. The selection condition calculation section changes relative merits of the attribute information relating to the data of the musical composition in accordance with details of the operational information obtained by the operational information obtaining section during the data of the musical composition being reproduced by the reproducing section, and then calculates, based on the relative merits of the attribute information, a condition for selecting the data of the musical composition to be reproduced by the reproduced section. Note that the operational information, which corresponds to a user's operation and represents an instruction on an action of the reproducing section, includes a skip operation which performs reproduction by skipping a reproduced musical composition, a repeat operation which performs the reproduction by repeating the reproduced musical composition, a rewinding operation which performs the reproduction by rewinding the reproduced musical composition, a fast-forward operation which performs the reproduction by fast-forwarding the reproduced musical composition, and a pause operation which suspends the reproduction of the reproduced musical composition, etc.

A second aspect is according to the above-described first aspect and the music reproduction device further comprises a clock section. The clock section measures an elapsed time from a reproduction start time point at which the reproduction section reproduces the data of the musical composition. The selection condition calculation section changes, when the operational information obtaining section obtains the operational information during the data of the musical composition being reproduced by the reproduction section, the relative merits of the attribute information relating to the data of the musical composition in accordance with the details of the operational information and the elapsed time when the operational information is obtained.

A third aspect is according to the above-described second aspect, and the selection condition calculation section changes, when the operational information obtaining section obtains the operational information during the data of the musical composition being reproduced by the reproduction section, the relative merits of the attribute information relating to the data of the musical composition in accordance with a feature level which has changed immediately before an obtaining time point of the operational information during the data of the musical composition being reproduced.

A fourth aspect is according to the above-described third aspect, and the selection condition calculation section changes, in the case where when the operational information obtaining section obtains the operational information during the data of the musical composition being reproduced by the reproduction section, the obtaining time point of the operational information during the data of the musical composition being reproduced is within a predetermined time from the reproduction start time point of the data of the musical composition, the relative merits of the attribute information relating to the data of the musical composition in accordance with the feature level which has changed immediately before the obtaining time point of the operational information.

A fifth aspect is according to the above-described first aspect, and the selection condition calculation section includes a weighting factor setting section. The weighting factor setting section sets a weighting factor which numerically represents the relative merits of the attribute information and manages the relative merits of the attribute information. The selection condition calculation section calculates the condition by regarding the data of the musical composition having the attribute information, whose weighting factor set by the weighting factor setting section is equal to or more than a first threshold, stored on the attribute information storage section, as a selection target to be reproduced by the reproduction section.

A sixth aspect is according to the above-described fifth aspect, and the selection condition calculation section calculates the condition by regarding the data of the musical composition having the attribute information, whose weighting factor set by the weighting factor setting section is equal to or more than the first threshold, stored in the attribute information storage section, as the selection target to be reproduced by the reproduction section, and regarding the data of the musical composition having the attribute information, whose weighting factor set by the weighting factor setting section is equal to or less than a second threshold which is less than the first threshold, stored in the attribute information storage section as a non-selection target not to be reproduced by the reproduction section.

A seventh aspect is according to the above-described fifth aspect, and in the case where the operational information obtained by the operational information obtaining section is an instruction of skipping the data of the musical composition being reproduced by the reproduction section, the selection condition calculation section lowers the weighting factor set, with respect to the attribute information relating to the data of the musical composition, by the weighting factor setting section.

An eighth aspect is according to the above-described fifth aspect, and in the case where the operational information obtaining section does not obtain the operational information during the data of the musical composition being reproduced by reproduction section, or in the case where an obtaining time point of the operational information during the data of the musical composition being reproduced exceeds a predetermined time from a reproduction start time point of the data of the musical composition, the selection condition calculation section raises the weighting factor set, with respect to the attribute information relating to the data of the musical composition, by the weighting factor setting section.

A ninth aspect is according to the above-described first aspect, and the control section further includes a resetting determining section. The resetting determining section provides, in the case where, when the reproduction section is sequentially reproducing the data of the musical composition selected based on the condition calculated by the selection condition calculation section, a ratio of a number of the musical compositions which have obtained the operational information during the reproduction to a number of reproduced musical compositions is equal to or more than a predetermined ratio, an instruction of calculating the condition again to the selection condition calculation section.

A tenth aspect is according to the above-described first aspect, and the attribute information comprises a musical feature level, a physical feature level, mapping information and bibliographic information. The musical feature level is at least one selected from a group of a tempo, a beat, tonality, a musical composition structure, a chord, tone quality, and a note number of a musical composition. The physical feature level is at least one selected from a group of a frequency of the musical composition, a music signal power level, and voice quality of a vocalist. The mapping information is derived by using the musical feature level, the physical feature level, and a mapping function. The bibliographic information is at least one selected from a group of an artist name, a musical composition title, a category name, lyrics, time of creation, a label, an adaptor, a composer, and a lyric writer.

An eleventh aspect is according to the above-described first aspect, and the music reproduction device further comprises a display control section. The display control section displays information on a display screen. The display control section displays, on the display screen, musical composition information, selection condition information, and play list information. The musical composition information represents the data of the musical composition being reproduced by the reproduction section. The selection condition information represents a selection condition calculated by the selection condition calculation section. The play list information represents the data of the musical composition expected to be selected based on the selection condition. The play list information is revised each time the selection condition calculation section calculates the selection condition.

A twelfth aspect is a music reproduction method for reproducing data of a musical composition selected from a plurality of musical compositions stored on a storage section. The music reproduction method comprises an attribute information storing step, a reproducing step, an operational information obtaining step, and a controlling step. The attribute information storing step stores attribute information, which is information relating to the data of the musical composition, on each of data of the plurality of the musical compositions stored on the storage section. The reproducing step reproduces the data of the musical composition stored on the storage section. The operational information obtaining step obtains operational information corresponding to a user's operation which represents an instruction on an action of the reproducing step. The controlling step selects the data of the musical composition to be reproduced by the reproducing step. The controlling step includes a selection condition calculation step. The selection condition calculation step changes relative merits of the attribute information relating to the data of the musical composition in accordance with details of the operational information obtained by the operational information obtaining step during the data of the musical composition being reproduced by the reproducing step, and then calculates, based on the relative merits of the attribute information, a condition for selecting the data of the musical composition to be reproduced by the reproduction step.

A thirteenth aspect is a music reproduction program executable by a computer of a device for reproducing data of a musical composition selected from a plurality of musical compositions stored on a storage section and a storage medium having the same stored thereon. The storage medium having the music reproduction program stored thereon causes the computer to execute an attribute information storing step, a reproducing step, an operational information obtaining step, and a controlling step. The attribute information storing step stores attribute information, which is information relating to the data of the musical composition, on each of data of the plurality of the musical compositions stored on the storage section. The reproducing step reproduces the data of the musical composition stored on the storage section. The operational information obtaining step obtains operational information corresponding to a user's operation which represents an instruction on an action of the reproducing step. The controlling step selects the data of the musical composition to be reproduced by the reproducing step. The controlling step includes a selection condition calculation step. The selection condition calculation step changes relative merits of the attribute information relating to the data of the musical composition in accordance with details of the operational information obtained by the operational information obtaining step during the data of the musical composition being reproduced by the reproducing step, and then calculates, based on the relative merits of the attribute information, a condition for selecting the data of the musical composition to be reproduced by the reproducing step.

A fourteenth aspect is an integrated circuit which is used in a music reproduction device. The music reproduction device includes a musical composition data storage section and an attribute information storage section. The musical composition data storage section stores data of a plurality of musical compositions. The attribute information storage section stores attribute information, which is information relating to the data of the musical composition, on data of each of the plurality of the musical compositions stored on the musical composition data storage section. The integrated circuit comprises a reproduction section, an operational information obtaining section, and a control section. The reproduction section reproduces the data of the musical composition stored on the musical composition data storage section. The operational information obtaining section obtains operational information corresponding to a user's operation which represents an instruction on an action of the reproduction section. The control section selects the data of the musical composition to be reproduced by the reproduction section. The control section includes a selection condition calculation section. The selection condition calculation section changes relative merits of the attribute information relating to the data of the musical composition in accordance with details of the operational information obtained by the operational information obtaining section during the data of the musical composition being reproduced by the reproduction section, and then calculates, based on the relative merits of the attribute information, a condition for selecting the data of the musical composition to be reproduced by the reproduction section.

According to the above-described first aspect, the relative merits of the attribute information which is the information relating to the data of the musical composition is changed based on the user's operational information, and a selection is performed based on the relative merits of the attribute information, whereby it is possible to reproduce only a musical composition desired to be listened to with the user's simple operation.

According to the above-described second aspect, in accordance with the details of the operation performed, with respect to the musical composition to be reproduced, by the user and timing thereof, an operational intent is assumed, whether or not the user likes the musical composition is determined, and then the relative merits of the attribute information is changed. For example, in the case where the user performs the skip operation at a start time point or in a former half part of the reproduced musical composition, it can be determined that the user does not like the musical composition. On the other hand, in the case where the same skip operation is performed at an end part of the reproduced musical composition, it can be assumed that the user likes the musical composition but desires to skip an ending accompaniment, and thus an accurate user preference can be reflected on the selection.

According to the above-described third aspect, if there is the feature level which has changed during reproduction, such as a change in which a vocal sound starts to be reproduced and a change in a tempo, and the user performs any operation immediately after the change, it can be determined that the feature level which has changed is a factor which the user does not like or that the feature level the user likes has finished. Therefore, by changing the relative merits of the attribute information in accordance with the change in the feature level of the reproduced musical composition, a further accurate user preference can be reflected on the selection.

According to the fourth aspect, an operation performed within the predetermined time from the reproduction start time point is reflected on the relative merits of the attribute information, whereby difference in the operational intent between at the start time point or in the former half part and in the ending part of the reproduced musical composition can be reflected appropriately.

According to the fifth aspect, the musical composition having the attribution information, whose weighting factors is equal to or more than the first threshold, assigned thereto is regarded as the selection target, whereby it is possible to select preferentially a musical composition containing elements liked by the user.

According to the sixth aspect, the musical compositions remaining after subtracting the musical compositions, each having the attribution information, whose weighting factor is equal to or less than the second threshold, assigned thereto, from the musical compositions, each having the attribution information, whose weighting factor is equal to or more than the first threshold, assigned thereto, are selection targets, whereby it is possible to perform the selection by subtracting the musical compositions including elements disliked by the user from the musical compositions including the elements liked by the user.

According to the seventh aspect, in accordance with the user's skip operation with respect to the reproduced musical composition, it is considered that the user does not like such a musical composition that satisfies the attribute information contained in the musical composition with respect to which the skip operation is performed, whereby the selection target can be determined.

According to the eighth aspect, in the case where the user reproduces the reproduced musical composition for at least the predetermined time or longer, it is considered that the user likes such a musical composition that satisfies the attribute information included therein, whereby the selection target can be determined.

According to the ninth aspect, the selection condition is reset, not based on only one operation, but when a rate of operation performed reaches a predetermined rate level or higher. For example, the user may performs the skip operation with respect to a given musical composition in spite of being in favor with the selection based on the current selection condition, and the current selection condition will be continuously applied to such an isolated operation. Therefore, there is no case where the selection condition is changed frequently contrary to the user's intention, whereby it is possible to perform a stable selection.

According to the tenth aspect, only musical compositions desired to be listened to can be reproduced, with the user's simple operation, by setting the musical feature level, the physical feature level, the mapping information, and the bibliographic information as elements for calculating the selection condition.

According to the eleventh aspect, the user can check the selection condition currently being calculated. Further, the play list information changes every second in accordance with the change in the selection condition, and thus it is possible to set even quickly the selection condition which the user intends by performing a given operation at timing when the musical composition the user desires to listen to is displayed on the play list.

According to the music reproduction recoding method, the music reproduction program or the storage medium having the same stored thereon, and the integrated circuit used for the music reproduction device of the present invention, the same effects as the above-described musical reproduction device can be obtained.

BRIEF DESCRIPTION OF THE DRAWINGS

FIG. 4 is an example of weighting factors each of which is initialized with respect to each piece of attribute information.

FIG. 5 is an example where parts of the weighting factors in FIG. 4 are lowered.

FIG. 6 is an example where parts of the weighting factor in FIG. 5 are raised.

FIG. 7 is an example of the weighting factors when the selection condition is set.

Figure 1:
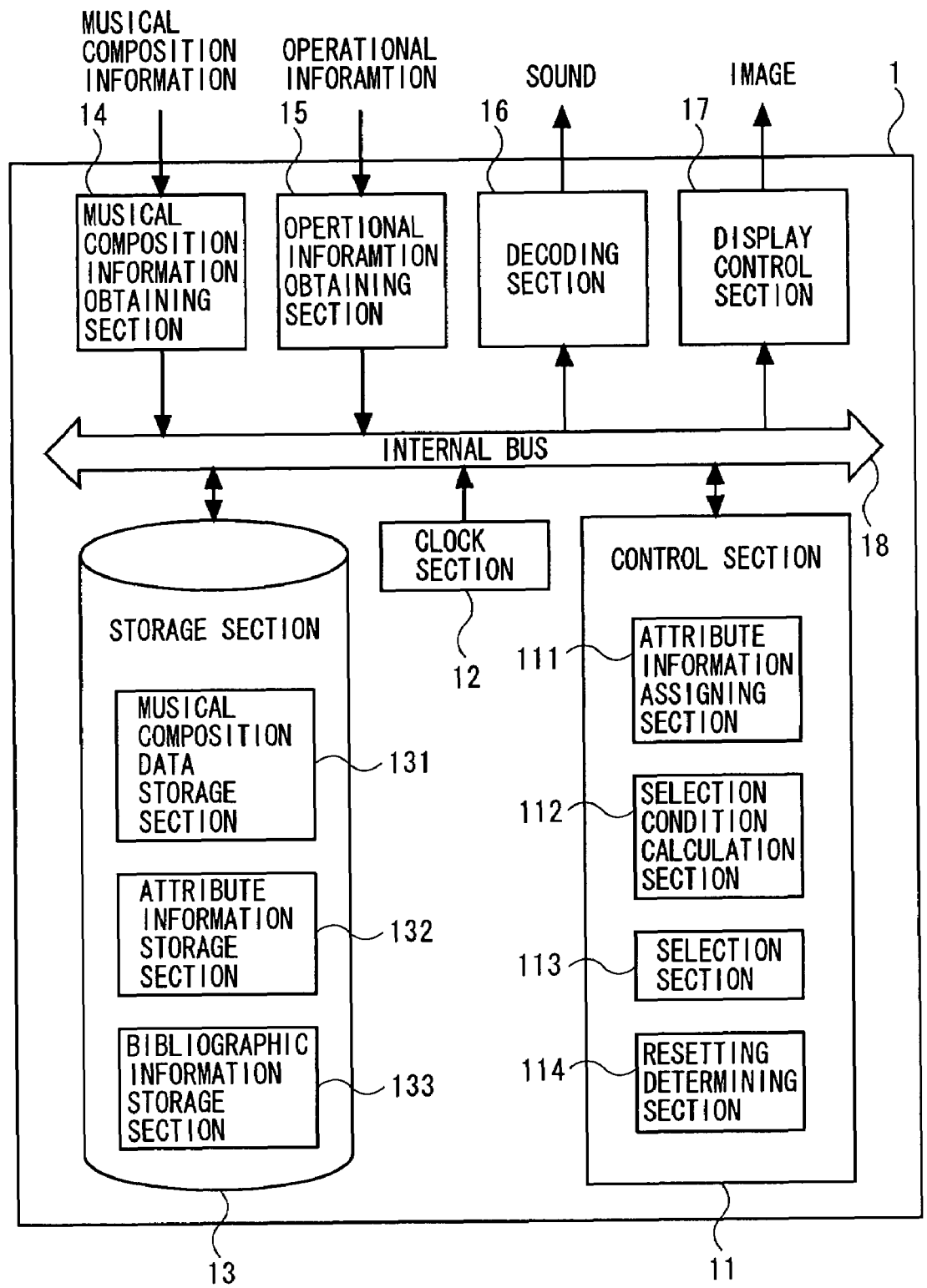
FIG. 1 is a block diagram showing a constitution of music reproduction devices according to first and second embodiments of the present invention.

DESCRIPTION OF THE REFERENCE CHARACTERS 1 music reproduction device
11 control section
111 attribute information assigning section
112 selection condition calculation section
113 selection section
114 resetting determining section
12 clock section
13 storage section
131 musical composition data storage section
132 attribute information storage section
133 bibliographic information storage section
14 musical composition information obtaining section
15 operational information obtaining section
16 decoding section
17 display control section
18 internal bus
50 display section

DETAILED DESCRIPTION OF THE INVENTION

FIRST EMBODIMENT

Hereinafter, with reference to drawings, a music reproduction device according to a first embodiment of the present invention will be described. The music reproduction device specifies attribute information assigned to a musical composition desired by a user, and performs continuous reproduction by selecting from data of a plurality of the musical compositions in accordance with the attribute information. Note that FIG. 1 is a block diagram showing a constitution of the music reproduction device. The music reproduction device is a movable reproduction device such as a vehicle-installed device and a portable-type device, or a stationary reproduction device, and specifically, realized by a portable music player, a car audio, a mini component, and a home server, etc.

In FIG. 1, a music reproduction device 1 includes a control section 11, a clock section 12, a storage section 13, a musical composition information obtaining section 14, an operational information obtaining section 15, a decoding section 16, a display control section 17, and an internal bus 18. The clock section 12 outputs time information to the internal bus 18. The musical composition information obtaining section 14 obtains, from an external part of the music reproduction device 1, data of musical compositions or bibliographic information relating to the musical composition, and outputs the same to the internal bus 18. The operational information obtaining section 15 obtains, by the user's operating (for example, pressing) an operating section such as a reproduction button and a skip button, operation information generated by the operating section, and then outputs the same to the internal bus 18. The decoding section 16, which corresponds to a reproducing section of the present invention, reproduces the data of the musical compositions stored, via the internal bus 18, on the storage section 13, and then outputs the same to an audio output device such as a speaker (not shown) connected to the music reproduction device 1. The display control section 17 displays a menu screen or a selection screen, etc. on the display section 50 (see FIG. 10) connected to the music reproduction device 1. The above-described audio output device and the display section 50 may be included in the music reproduction device 1, or may be an external device of the music reproduction device 1.

The control section 11 includes an attribute information assigning section 111, a selection condition calculation section 112, a selection section 113, and a resetting determining section 114. The attribute information assigning section 111 assigns, to each of the data of the plurality of the musical composition stored on the storage section 13, the attribute information such as a musical feature level, a physical feature level, and the bibliographic information relating thereto, and then stores the same on the storage section 13. The selection condition calculation section 112 calculates the attribute information of data of a musical composition to be a selection target. The resetting determining section 114 determines whether or not a set selection condition is to be reset, and provides, at the time of resetting, an instruction of resetting the selection condition to the selection condition calculation section 112.

Note that respective functional blocks of the control section 11 (the attribute information assigning section 111, the selection condition calculation section 112, the selection section 113, and the resetting determining section 114), the musical composition information obtaining section 14, the operational information obtaining section 15, the decoding section 16, and the display control section 17 as shown in FIG. 1 may, typically, be realized as an LSI, which corresponds to an integrated circuit. These may be constructed in a chip form respectively, or may be constructed in a chip form so as to include a part or all thereof.

Further, a method of integration is not limited to the LSI, and may be realized by a dedicated circuit or a general-purpose processor. Further, an FPGA (Field Programmable Gate Array) which can be programmed after LSI manufacture, or a reconfigurable processor enabling connections and settings of circuit cells in the LSI to be reconfigured may be used. Further, in the case where another integration technology replacing the LSI becomes available due to improvement of a semiconductor technology or due to the emergence of another technology derived therefrom, integration of the functional blocks may be performed using such technology. For example, biotechnology may be applied.

The storage section 13 includes a musical composition data storage section 131, an attribute information storage section 132, and a bibliographic information storage section 133. The musical composition data storage section 131 stores the data of the plurality of the musical compositions. The attribute information storage section 132 stores the attribute information, which is assigned by the attribute information assigning section 11 and related to each of the data of the plurality of the musical compositions stored on the musical composition data storage section 131. The bibliographic information storage section 133 stores the bibliographic information relating to data of a musical composition such as an artist name and a category name. For example, on the bibliographic information storage section 133, database information which is obtained by assessing CDDB (CD Database) and the like is stored previously. It is preferable that storage details of the bibliographic information storage section 133 is revised, on a regular basis, via a network or a storage medium, etc.

Next, an action of the music reproduction device 1 storing the data of the musical compositions on the storage section 13 will be described. The musical composition information obtaining section 14 of the music reproduction device 1 obtains the data of the musical compositions by driving a music media, or by accessing another music media server via a communication medium, and then stores the same on the musical composition data storage section 131. When the musical composition information obtaining section 14 obtains the data of the musical compositions, the attribute information assigning section 111 acts so as to assign the attribute information relating to the obtained musical composition. Here, the attribute information assigned by the attribute information assigning section 11 includes the musical feature level, the physical feature level, and the bibliographic information, etc. For example, when the musical composition information obtaining section 14 obtains the musical composition by driving a CD, the attribute information assigning section 111 refers to the bibliographic information storage section 133 by using TOC (Table of Contents) information of the driven CD as a key, and then obtains the bibliographic information relating to data of a musical composition to be stored. Here the bibliographic information includes the artist name, a musical composition title, the category name, lyrics, time of creation, a label, an adapter, a composer, and a lyric writer, etc. Further, the attribute information assigning section 111 analyzes the data of the musical compositions, extracts the feature level, and stores the obtained bibliographic information and the feature level on the attribute information storage section 132. Here, the feature level includes the musical feature level such as a tempo, a beat, tonality, a musical composition structure, a chord, a tone, and a note number, etc. of the musical composition, and physical feature level such as a frequency, a music signal power level, and voice quality of a vocalist, etc., and mapping information derived by using values of the musical feature level and physical feature level, etc., and a mapping function. For example, the mapping information corresponds to sensibility information representing an impression of the musical composition such as an upbeat music and a downbeat music.

Note that in the case where the musical composition information obtaining section 14 obtains the attribute information along with the data of the musical compositions through an electronic music distribution or the like, the attribute information to be distributed may be stored on the attribute information storage section 132. Further, in the case where the attribute information is stored on an ID3 tag such as an MP3 file etc., the attribute information on the ID3 tag may be stored on the attribute information storage section 132. Further, without using the bibliographic information which is stored on the bibliographic information storage section 133, the bibliographic information may be obtained by using, via a network, a database placed on a site.

Figure 2:
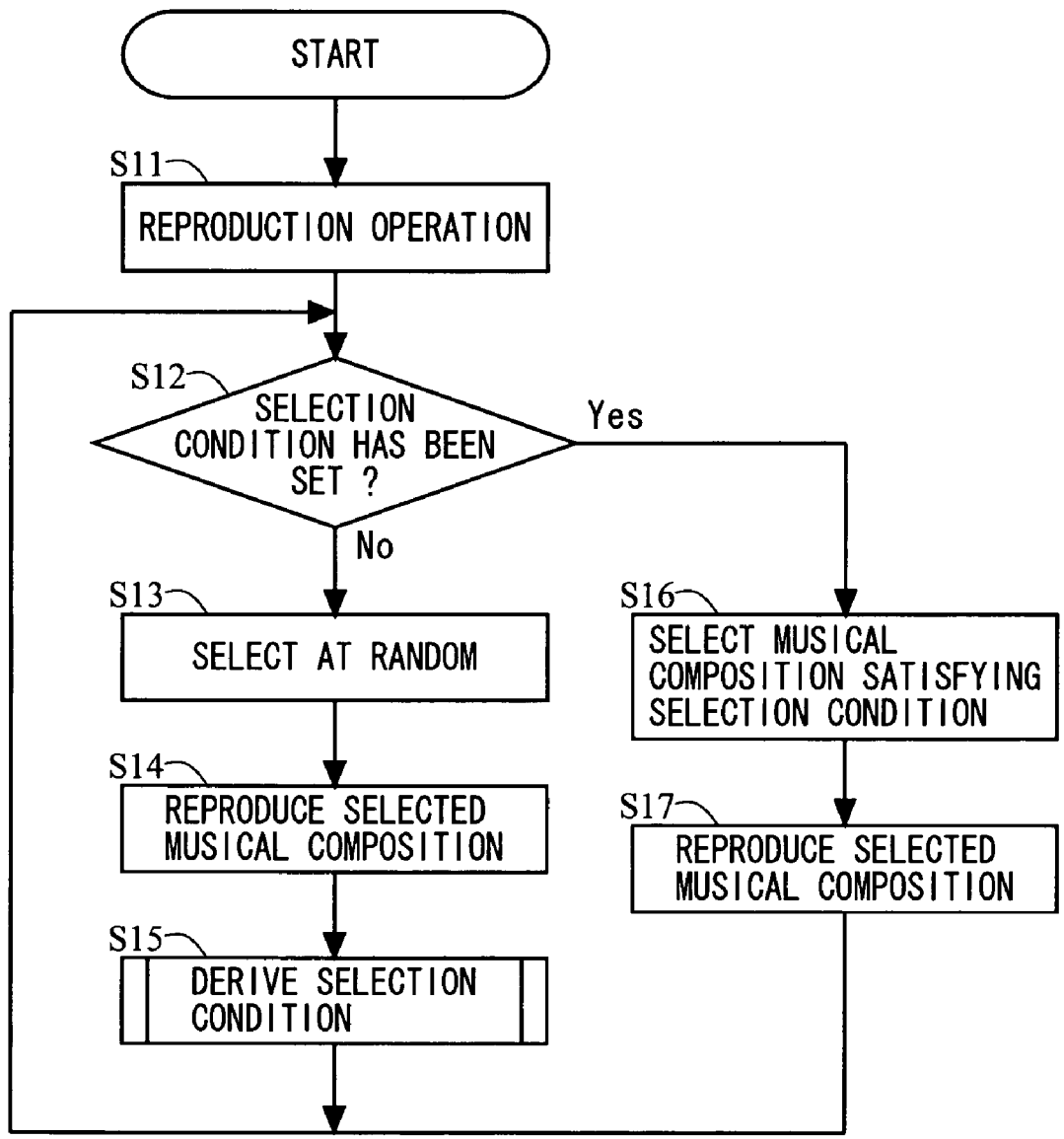
FIG. 2 is a flow chart showing an action of the musical reproduction device 1 of FIG. 1 performing continuous reproduction.
Figure 3:
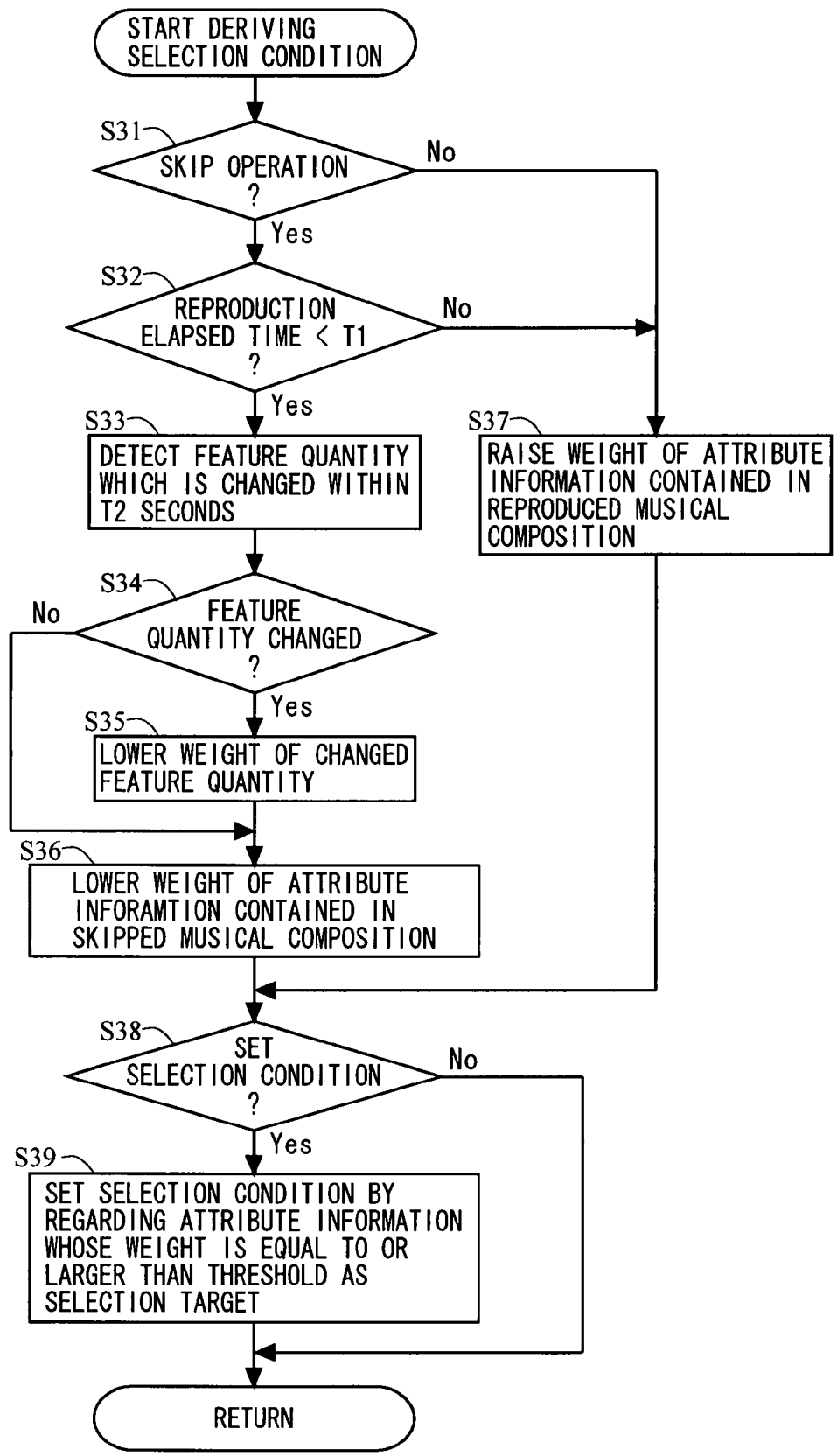
FIG. 3 is a subroutine showing details of an action of deriving a selection condition, in step S15 of FIG. 2, according to the first embodiment of the present invention.

Next, with reference to FIG. 2 and FIG. 3, an action of the music reproduction device 1 performing the continuous reproduction will be described. Note that FIG. 2 is a flow chart showing the action of the musical reproduction device 1 performing the continuous reproduction. FIG. 3 is a subroutine showing details of an action of deriving a selection condition in step S15 of FIG. 2.

In FIG. 2, the operational information obtaining section 15 of the music reproduction device 1 obtains operational information which corresponds to the user's instruction of reproducing the musical composition (step S11). Next, the control section 11 determines whether or not the selection condition is already set (step S12). And then, in the case where the selection condition is not yet set, the control section 11 forwards a processing to next step S13. On the other hand, in the case where the selection condition is already set, the control section 11 forwards the processing to next step S16.

In step S13, the selection section 113 selects data of a musical composition at random from data of musical compositions stored on the musical composition data storage section 131. Next, the decoding section 16 reproduces the data of the musical composition selected by the selection section 113 (step S14). And then, the control section 11 derives the selection condition (step S15), and returns to above-described step S12 to repeat the processing. Hereinafter, with reference to FIG. 3, the action of deriving the selection condition in above-described step S15 will be described.

In FIG. 3, the control section 11 determines whether or not the operational information obtaining section 15 has obtained operational information which corresponds to the user's instruction of skipping reproduction of the musical composition during the reproduction, in above-described step S14, of the data of the musical composition (step S31). In the case where a skip operation is performed, the selection section 113 obtains time information from the clock section 12, and measures reproduction elapsed time, from a reproduction start time point to the skip operation time point, of the data the musical composition reproduced in above-described step S14. In the case where the measured reproduction elapsed time is less than time T1 seconds (for example, a half of a total reproduction time of a musical composition being reproduced), the selection condition calculation section 112 determines that the musical composition reproduced in above-described step S14 is a musical composition which is not currently liked by the user, and forwards the processing to next step S33. On the other hand, in the case where it is determined that the skip operation is not performed in above-described S31, or in the case where the above-described measured reproduction elapsed time is equal to or more than time T1 seconds, the selection condition calculation section 112 forwards the processing to next step S37.

In step S33, the selection condition calculation section 112 detects the feature level which has changed within time T2 seconds before the above-described skip operation time point. Here, there is a T2<T1 relation, and time T2 is set within 1 to 10 seconds. Next, the selection condition calculation section 112 determines whether or not there is the feature level which has changed within the time T2 seconds before the skip operation time point (step S34). And then, the selection condition calculation section 112 determines, in the case where there is the feature level which has changed, that the changed feature level is a major factor which the user dislikes, lowers a weighting factor (described hereinbelow) set to the feature level (step S35), and then forwards the processing to next step S36. For example, as an example of the change in the feature level during the musical composition, there is a change in which a vocal sound starts to be reproduced, or a change in a tempo, etc. Typically, the selection condition calculation section 112 extracts, as the change in the feature level, a substantial change in which the attribute information changes into a different classification (for example, a change in which a beat of a musical composition changes from a "2 beat" classification to a "4 beat" classification). On the other hand, the selection condition calculation section 112 directly forwards, in the case where there is no feature level which has changed, the processing to next step S36.

In step S36, the selection condition calculation section 112 determines that the attribute information contained in the musical composition, with respect to which the skip operation is performed, contains a factor which causes the user not to desire to listen, lowers the weighting factor set to the attribute information, and then forwards the processing to next step S38. Note that in above-described step S35 and step S36, there is a case where the weighting factor set to one piece of attribute information is lowered twice, and thus in such case, the attribute information whose weighting factor is lowered in step S35 is excluded in step S36, and then the weighting factor which is set to the attribute information contained in the musical composition with respect to which the skip operation is performed may be lowered. Further, a range of lowering, which is performed in above-described step S35 of the weighting factor set to the feature level which has changed within the time T2 seconds before the skip operation time point, and a range of lowering, which is performed in above-described step S36, of the weighting factor set to the attribute information contained in the musical composition with respect to which the skip operation is performed, may be different from each other, or may be identical to each other. For example, in the case where there is the feature level which has changed within the time T2 seconds before the skip operation time point, the range of the lowering of the weighting factor set to the feature level may be increased, and the range of the lowering of the weighting factor, which is performed in above-described step S36, may be decreased. Further, either of the range of the lowering of the weighting factor performed in above-described step S35 or the range of the lowering of the weighting factor performed in above-described step S36 may be set to zero (0). Further, according to whether or not there is the feature level which has changed within the time T2 seconds before the skip operation time point, the range of the lowering of the weighting factor, which is performed in above-described step S36, set to the attribute information contained in the musical composition with respect to which the skip operation is performed may be changed.

On the other hand, in the case where it is determined that the skip operation is not performed in above-described step S31, or in the case where the above-described measured reproduction elapsed time is equal to or more than time T1 seconds, the selection condition calculation section 112 determines that the user is satisfied with the musical composition being reproduced, and raises the weighting factor set to the attribute information contained in the reproduced musical composition (step S37). And then, the processing is forwarded to next step S38. In this manner, in the case where the skip operation is not performed during the reproduction of the musical composition, it is determined that the user is satisfied with the musical composition, and the weighting factor set to the attribute information contained in the musical composition will be added up. Further, in the case where the reproduction elapsed time at the time of the skip operation being performed is equal to or more than time T1 seconds, it is determined that the user is satisfied with the selected musical composition, but only becomes bored with the musical composition, and thus the weighting factor set to the attribute information contained in the musical composition will be added up. Note that processing of raising the weighting factor as above described is not necessarily performed. In this case, the weighting factor will not be increased, and thus the selection condition is set by setting a threshold to be described hereinbelow at a value equal to or more than a default value of the weighting factor.

In step S38, the selection condition calculation section 112 determines whether or not the selection condition is to be set.

Here, it is thought that only by increasing/decreasing the weighting factor which is set, based on the reproduction of only one musical composition, to the attribute information, clear difference in the weighting factor will not be seen. Therefore, as an example, the selection condition calculation section 112 reproduces a plurality of predetermined musical compositions (e.g. five musical compositions) at random (steps S13, S14), repeats the actions of above-described steps S31 to S37, and then sets the selection condition. As another example, the selection condition calculation section 112 sets the selection condition after repeating the actions of above-described steps S31 to s37 until at least one of the weighting factors set to the attribute information becomes a value equal to or more than a predetermined threshold. And then, the selection condition calculation section 112 forwards, in the case of setting the selection condition, the processing to next step S39, and terminates, in the case of not yet setting the selection condition, the processing based on the subroutine and repeats the processing after returning to above-described step S12.

In step S39, the selection condition calculation section 112 sets the selection condition by regarding data of the musical composition including the attribute information whose weighting factor is equal to or more than the threshold as a condition of the musical composition the user desires to listen to, that is, the selection target. And then, the selection condition calculation section 112 terminates the processing based on the subroutine and repeats the processing after returning to above-described step S12. In this manner, processing of increasing/decreasing of the weighting factor is repeated with respect to the plurality of the musical compositions selected at random, and then the attribute information whose weighting factor becomes a value equal to or more than the threshold is derived as the condition of the musical composition the user desires to listen to, that is, the selection condition. Note that even if the weighting factor is less than the above-described threshold, top several pieces of the attribute information whose weighting factors are relatively large may be set as the selection condition. Further, the attribute information which has become equal to or more than the above-described threshold may be added to the selection condition in sequence so as to be used for a selection in above-described step S13, and when a predetermined number of pieces of the attribute information is added to the selection condition, the selection condition may be set.

Returning to FIG. 2, in the case where the selection condition is set in above-described step S12, the selection section 113 searches the attribute information, which satisfies the selection condition derived by the selection condition calculation section 112, from the attribute information storage section 132, and selects, from the data of the musical compositions storage section 131, data of a musical composition including the searched attribute information (step S16). Next, the decoding section 16 reproduces the data of the musical composition selected by the selection section 113 (step S17), returns to above-described step S12, and repeats the processing.

In this manner, in the case where the selection condition is already set, the musical composition is selected based on the selection condition, and the continuous reproduction is performed. On the other hand, in the case where the selection condition is not set, a random selection is performed, the continuous reproduction is performed, and then the selection condition is set based on the skip operation which the user performs with respect to such selection and reproduction. In the case of the continuous reproduction after the selection condition being set, it may be considered that the user is satisfied with the selection condition, whereby the weighting factor set to the attribute information contained in the reproduced musical composition may be raised.

As above described, the selection condition calculation section 112 sets, with respect to each piece of the attribute information, the weighting factor so as to derive the selection condition, and sets relative merits of the attribute information according to the value of the weighting factor. With reference to FIG. 4 to FIG. 7, an example of a change in the weighting factor set to the attribute information will be described. FIG. 4 is an example of the weighting factors each of which is initialized with respect to each piece of the attribute information. FIG. 5 is an example where parts of the weighting factors in FIG. 4 are lowered. FIG. 6 is an example where parts of the weighting factor in FIG. 5 are raised. FIG. 7 is an example of the weighting factors when the selection condition is set. Note that in FIG. 4 to FIG. 7, for the sake of a specific description, of the attribute information, "slow tempo", "normal tempo", "fast tempo", "2 beat", "4 beat", "8 beat", "16 beat", "female vocalist", and "male vocalist" are focused on, and the threshold of each of the above-described weighting factors is set at "15".

In FIG. 4, the selection condition calculation section 112 sets each of the weighting factors initialized with respect to each piece of the attribute information at a default value of "10". Next, suppose that the selection section 113 selects a musical composition of a slow tempo, a 4 beat, and a male vocalist, and the decoding section 16 reproduces the same. Also suppose that, during reproducing a former half of the selected musical composition, the user performs the skip operation when the male vocalist starts singing. In this case, the skip operation is performed at a time point of reproduction of the male vocalist, and thus "male vocalist" is regarded as a major factor which causes the user not to desire to listen. Therefore, the selection condition calculation section 112 subtracts, in above-described step S35, "2" from the weighting factor set to the attribute information "male vocalist", to obtain "8". Further, the selection condition calculation section 112 subtracts, in above-described step S36, "1" from weighting factors set to respective pieces of the attribute information ("slow temp", "4 beat") other than "male vocalist", which are included in the reproduced musical composition, to obtain "9" (a state of FIG. 5).

Next, suppose that the selection section 113 selects a musical composition of a fast tempo, a 16 beat, and a female vocalist, and the decoding section 16 reproduces the same. Also suppose that the user reproduces the selected musical composition until an end thereof without performing the skip operation during the reproduction. In this case, it is considered that the attribution information contained in the reproduced musical composition contains a factor which causes the user to desire to listen. Accordingly, the selection condition calculation section 112 adds, in above-described step S37, "1" to the weighting factors set to respective pieces of the attribute information ("fast tempo", "16 beat", and "female vocalist"), which are included in the reproduced musical composition, to obtain 11 (a state of FIG. 6).

Suppose that, by repeating the increasing/decreasing of the weighting factor in this manner, the weighting factors set to the attribute information "fast tempo" and "female vocalist" has reached to the threshold "15" (a state of FIG. 7). In this case, the selection condition calculation section 112 sets the selection condition by setting the musical composition containing the attribute information "fast tempo" and/or "female vocalist" as the selection target.

In above description, control of the increasing/decreasing of the weighting factor of the attribute information when the user performs, with respect to the music reproduction device 1, the skip operation is described, however, the weighting factor may be increased/decreased according to another operation. For example, the weighting factor of the attribute information may be increased/decreased when the user performs volume control during the reproduction of the musical composition which is selected at random. In this case, according to the user's operation of a volume increase, the weighting factor of the feature level, which has changed within time T2 seconds before the operation time point, is raised, regardless of the reproduction elapsed time. On the other hand, according to an operation of a volume decrease, the weighting factor of the feature level changed within time T2 seconds before the operation time point is lowered.

In the case where the weighting factor of the attribute information is decreased/increased by a volume control operation performed by the user during the reproduction of the musical composition selected at random, a range of raising and the range of lowering of the weighting factor may be changed according to a change amount of the volume which is changed by the volume control operation. This is an action which causes to be determined that when the user performs the operation of increasing the volume and when the change amount of increasing the volume is large, the user likes the feature level which has changed around the operation time point. Further, when the user performs the operation of decreasing the volume, and when the amount of the change in decreasing the volume is large, this is the action which causes to be determined that the user dislikes, to a large extent, the feature level which has changed around the operation time point. In this case, according to the user's operation of increasing the volume, the weighting factor of the feature level changed within time T2 seconds before the operation time point is raised by the range of raising corresponding to the change amount of the volume increased by the operation, regardless of the reproduction elapsed time. On the other hand, according to the user's operation of decreasing the volume, the weighting factor of the feature level changed within time T2 seconds before the operation time point is lowered by the rage of lowering corresponding to the change amount of the volume decreased by the operation, regardless of the reproduction elapsed time.

Further, when the user performs a repeat operation during reproducing the musical composition selected at random, the weighting factor of the attribute information may be increased/decreased. In this case, according to an event where reproduction has been started again from a beginning of the musical composition in accordance with the user's repeat operation, it is determined that the user likes the musical composition regardless of the reproduction elapsed time until the repeat operation time point, and consequently the weighting factor set to the attribute information contained in the reproduced musical composition is raised. In the case where the user performs the repeat operation twice or more with respect to a single musical composition, to avoid an excessive increase in the weighting factor, the weighting factor set to the attribute information contained in the reproduced musical composition is not necessarily raised at a second time onward. Further, in the case where a certain musical composition is set, prior to the reproduction thereof, as a musical composition to be reproduced repeatedly, it is determined that the user likes the musical composition to a large extent, and accordingly, the weighting factor set to the attribute information contained in the musical composition may be raised.

Further, when the user performs rewind or fast-forward operation during reproducing the musical composition selected at random, the weighting factor of the attribute information may be increased/decreased. In this case, the reproduced musical composition is skipped to a time point corresponding to the user's rewind or fast-forward operation and then reproduced, and therefore, the weighting factor of the feature level which changes at the time point is raised. Note that the range of raising of the weighting factor corresponding to the rewind or fast-forward operation may be the same as the range of raising corresponding to the above-described repeat operation, or either may be greater than another.

Further, when the user performs a pause operation during reproducing the musical composition selected at random, the weighting factor of the attribute information may be increased/decreased. In this case, it is determined that the user has suspended, for any reason, the reproduction of the musical composition selected at random, but likes the musical composition and desires the continuous reproduction thereof, and consequently the weighting factor set to the attribute information contained in the musical composition is raised regardless of the reproduction elapsed time.

Further, in the above description, with regard to the selection before setting the selection condition, the random selection is performed, but a plurality of sample musical compositions may be set, in advance, so as to derive efficiently the selection condition from the data of the musical compositions, thereby selecting and reproducing the sample musical compositions in sequence. Such musical compositions that include the attribute information having wide variations are set as the above-described sample musical compositions, whereby the weighting factor will not increase/decrease unevenly, and consequently it is possible to derive efficiently an appropriate selection condition desired by the user. Alternatively, it may be controlled such that a musical composition which does not includes the attribute information contained in the musical composition, with respect to which the skip operation is performed, is selected as a next musical composition, thereby deriving the selection condition efficiently.

Further, in the case where the user directly searches and reproduces the musical composition desired to be reproduced, instead of the random selection, it is considered that the user desires such musical composition that includes the attribute information contained in the searched musical composition, and thus the weighting factor set to the attribute information contained in the searched musical composition may be controlled to be raised.

Further, in the above description, the random selection is conducted as the selection before setting the selection condition, but the set selection condition may be stored and then the selection may be performed by temporarily using a past selection condition. For example, the selection condition set the last time may be used, and the selection condition highly frequently set in the past history may be used temporarily. Alternatively, the selection condition highly frequently set is memorized based on a time environment such as a time zone, a day of the week, and a season when the selection condition is set, and the selection before setting the selection condition is performed by using temporarily the past selection condition corresponding to a current date and time. Note that the time environment may be other than the time zone, the day of the week, and the season, and, may be memorized, for example, based on a public holiday, or a special day for the user, etc.

In the above description, based on the time point of the skip operation, the feature level which has changed immediately there before, and the attribute information contained in the musical composition, the weighting factor set to the attribute information is increased/decreased, however, the range of the increasing/decreasing or a direction of the increasing/decreasing is an example, and a different increasing/decreasing method may be applicable.

Figure 8:
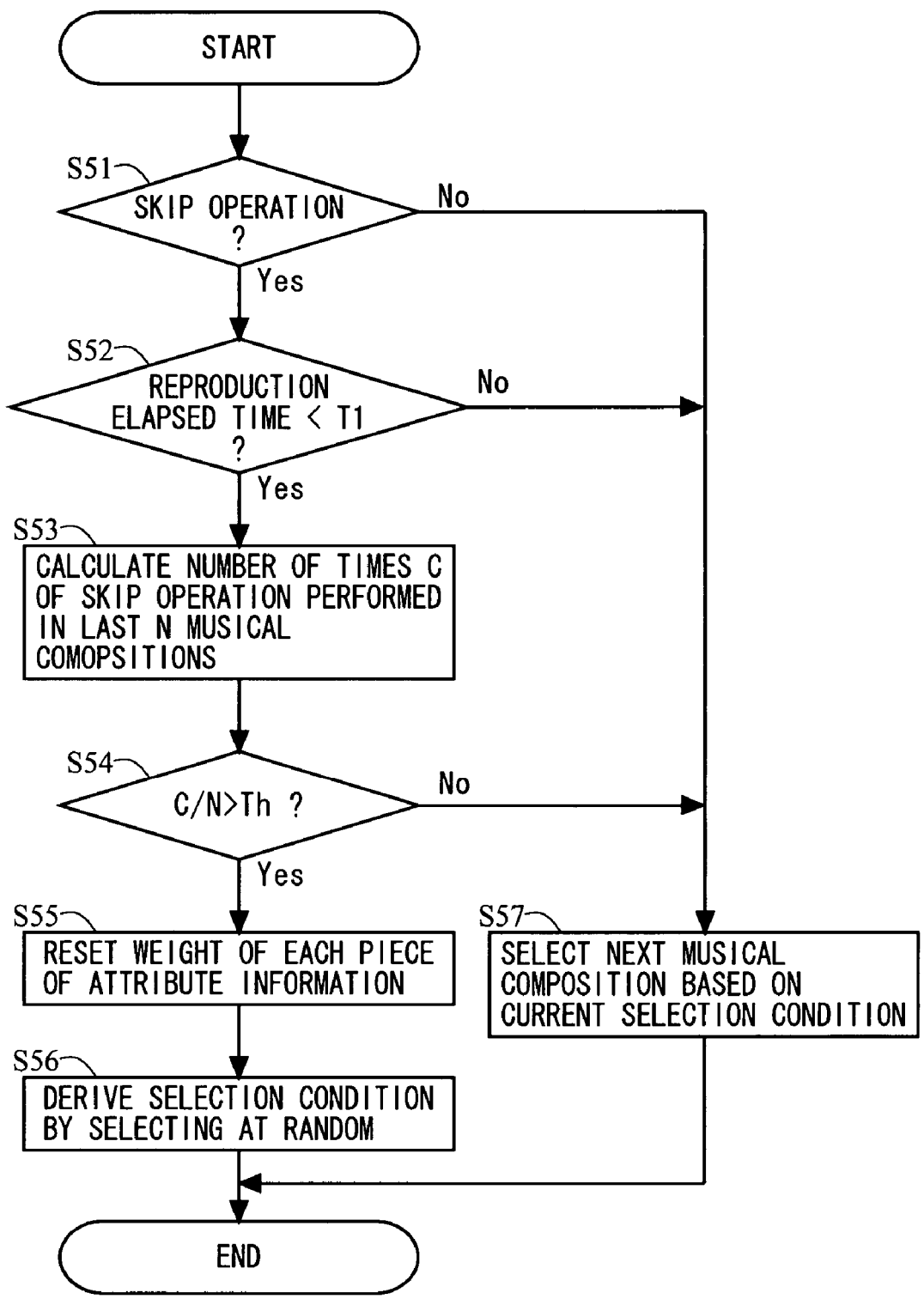
FIG. 8 is a flow chart showing an action of changing processing of the selection condition performed by the music reproduction device 1 of FIG. 1.

Here, if the continuous reproduction is performed, after the selection condition is set based on the above-described method, in accordance with a single selection condition for a long period of time, it is thought that the user will become bored with the musical composition based on the selection condition. That is, the user feels like listening to a musical composition based on a different selection condition, and thus the selection condition is required to be changed. Hereinafter, with reference to FIG. 8, changing processing of the selection condition will be described. FIG. 8 is a flow chart showing an action of the changing processing of the selection condition performed by the music reproduction device 1. An action described hereinbelow is an example in which in the case where the user performs the skip operation equal to or more than a predetermined times during the continuous reproduction after setting the selection condition, it is determined that a musical composition based no a different selection condition is desired.

In FIG. 8, in the case where the user performs, during the continuous reproduction (an action of step S17 in FIG. 2) after the selection condition calculation section 112 sets the selection condition, the skip operation (Yes in both steps S51 and S52) with respect to the music reproduction device 1 at a time point at which the reproduction elapsed time is less than time T1 seconds, the resetting determining section 114 forwards the processing to next step S53. On the other hand, the resetting determining section 114 selects, in the case where the user does not perform the skip operation during the above-described continuous reproduction (No in step S51), or in the case where the user performs the skip operation at a time point at which the reproduction elapsed time is equal to or more than time T1 seconds (No in step S52), a next musical composition based on the current selection condition (step S57), continues the continuous reproduction, and then terminates the processing based on the flow chart.

In step S53, the resetting determining section 114 sets N musical compositions immediately before and including a currently reproduced musical composition as targets, and calculates a number of times C skip operation is performed within the reproduction elapsed time which is less than time T1 seconds. Next, the resetting determining section 114 calculates a ratio of the number of the times C to the above-described N musical compositions (C/N) and determines whether or not the ratio C/N is more than a predetermined selection condition changing threshold Th (step S54). And in the case of C/N>Th, the resetting determining section 114 determines that the user has become bored with the continuous reproduction based on the current selection condition, and thus resets, to the default value, each of the weighting factors set to the attribute information (step S55), gives, based on the random selection, an instruction of deriving a new selection condition to the selection condition calculation section 112 (step S56), and then terminates the processing based on the flow chart. Note that the processing performed by the selection condition calculation section 112 in accordance with above-described step S56 is performed based on the flow charts shown in FIG. 2 and FIG. 3. On the other hand, in the case of C/N≦Th, the resetting determining section 114 performs the processing of the above-described step S57, and terminates the processing based on the flow chart.

Figure 9:
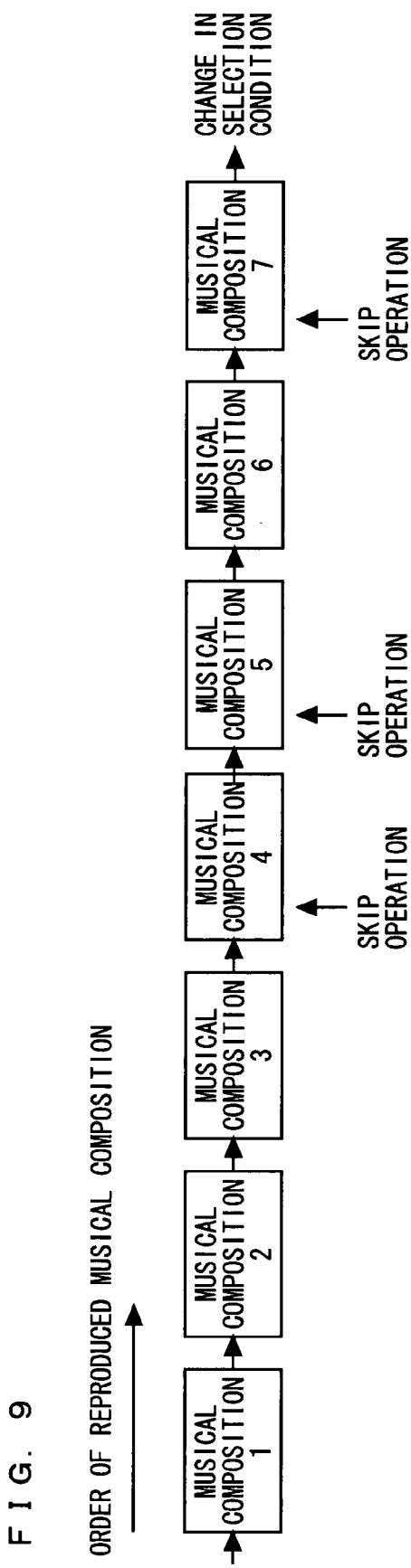
FIG. 9 is a timing diagram illustrating a specific example of timing of starting a change in the selection condition.

In this manner, the resetting determining section 114 determines, when the above-described C/N is more than the predetermined selection condition changing threshold, that the user has become bored with the continuous reproduction based on the current selection condition, and performs resetting of the selection condition. Hereinafter, by using FIG. 9, a specific example of timing of resetting the selection condition will be described. FIG. 9 is a timing diagram illustrating the specific example of timing of starting a change in the selection condition.

In FIG. 9, the music reproduction device 1 selects and reproduces, in sequence, musical composition 1 to musical composition 7 in accordance with the set selection condition. Here, for the sake of a specific description, suppose that the resetting determining section 114 sets N=4 and Th=0.7.

In the case where, in the continuous reproduction in which musical composition 1 to musical composition 7 are selected in sequence, the user does not performs the skip operation with respect to musical composition 1 to musical composition 3, and then performs the skip operation at a time point at which the reproduction elapsed time of musical composition 4 is less than time T1 seconds, the number of the times C of the skip operation performed with respect to N musical compositions (that is, four musical compositions including musical composition 1 to musical composition 4) is one (that is, musical composition 4 only), and thus C/N=1/4 is satisfied. That is, due to C/N<Th, the resetting determining section 114 selects musical composition 5 in accordance with the current selection condition without resetting the selection condition. Next, in the case where the user performs the skip operation at a time point at which the reproduction elapsed time is less than time T1 seconds, the number of the times C of the skip operation performed with respect to N musical compositions (that is four musical compositions including musical composition 2 to musical composition 5) is two (that is musical composition 4 and musical composition 5), and thus C/N=2/4 is satisfied. That is, due to C/N<Th, the resetting determining section 114 selects musical composition 6 in accordance with the current selection condition without resetting the selection condition. Further, in the case where the user does not performs the skip operation with respect to musical composition 6, and then performs the skip operation at the time point at which the reproduction elapsed time of musical composition 7 is less than time T1 seconds, the number of the times of the skip operation performed with respect to N musical compositions (that is four musical compositions including musical composition 4 to musical composition 7) is three (that is, musical composition 4, musical composition 5, and musical composition 7), and thus C/N=3/4 is satisfied. That is, due to C/N>Th, the resetting determining section 114 resets the selection condition, and gives an instruction of resetting to change the selection condition. Note that values of N and Th are one of the examples, and different values may be applicable.

In this manner, the resetting of the selection condition is not performed based on only one skip operation, and performed when the ratio of the skip operation reaches a predetermined threshold or more. For example, there is a case where the user performs the skip operation with respect to a certain musical composition, in spite of liking the selection based on the current selection condition, and with respect to such an isolated operation, the current selection condition is continuously used. Therefore, there is no case where the selection condition is changed frequently contrary to the user's intention, whereby a stable selection and continuous reproduction can be performed.

The action, based on the selection condition, performed by the selection section 113 after the instruction of the resetting of the selection condition given by the resetting determining section 114 corresponds to the random selection in step S13, based on the flow chart of FIG. 2, but the selection may be performed based on a different selection method. For example, it is obvious that the user is bored with the selection condition set before the resetting, in the case of after an action of step S55 of the flow chart shown in FIG. 8. That is, it is considered that the user desires to reproduce a musical composition which is not selected based on the selection condition before resetting. Therefore, in order that the user can select at least in accordance with a condition which is different from the existing selection condition, selection processing in step S13 of FIG. 2 may be performed by selecting several pieces of the attribute information at random, except for such attribute information that is set to the selection condition, so as to be set as a default selection condition. Alternatively, before resetting, in above-described step S55, each of the weighting factors set to the attribute information, a predetermined threshold (for example, a threshold for setting the selection condition) may be set to each of the weighting factors, and the selection processing in step S13 of FIG. 2 may be performed by setting the attribute information which is equal to or less than the threshold as the selection condition.

In this manner, in the music reproduction device according to the present embodiment, the user can set the selection condition only by performing a simple operation such as the skip operation, and thus without taking effort such as a selection one by one, the user can select a currently desired musical composition and enjoy music.

Figure 10:
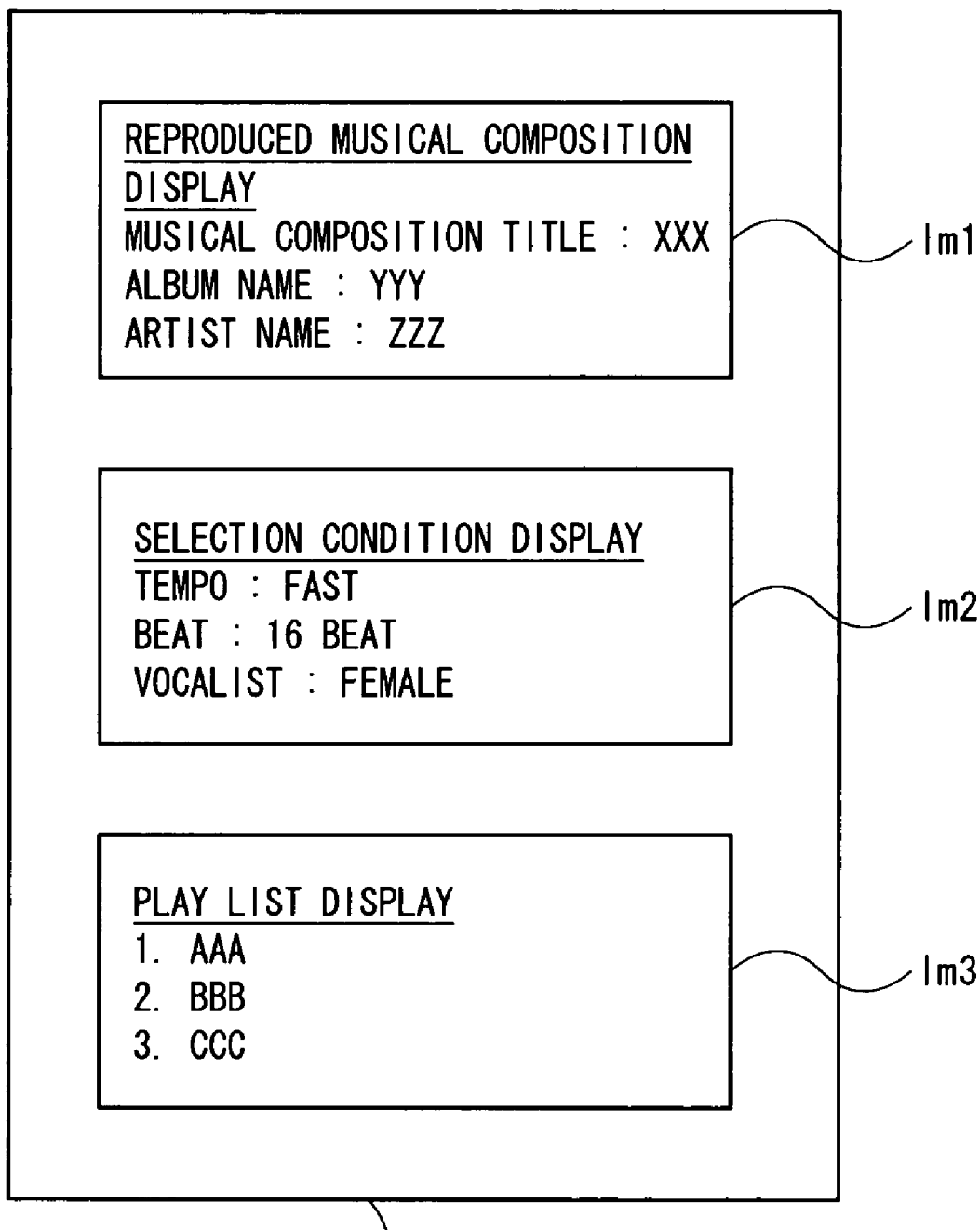
FIG. 10 is a diagram showing an example of information displayed on a display screen of a display section 50 according to the first embodiment of the present invention.

Processing information such as the above-described selection condition may be displayed on a display screen of the display section 50 embedded in or connected to the music reproduction device 1. Hereinafter, with reference to FIG. 10, information displayed on the display screen of the display section 50 will be described. Note that, FIG. 10 is a diagram showing an example of the information displayed on the display screen of the display section 50. Here, the display section 50 may be included in the music reproduction device 1, or may be an external device of the music reproduction device 1. Even if the display section 50 is in either form, the display control section 17 (see FIG. 1) performs output of displaying a menu or selection information, etc. on the display section 50.

In FIG. 10, during the continuous reproduction after setting the above-described selection condition, reproduced musical composition display information Im1, selection condition display information Im1, and play list display information Im3 are displayed on the display screen of the display section 50 based on a control by the control section 17. The reproduced musical composition display information Im1 is information relating to the musical composition which the music reproduction device 1 is currently reproducing, and represents, for example, a musical composition title (XXX) of the reproduced musical composition, an album name (YYY) containing the reproduced musical composition, and an artist name (ZZZ) of the reproduced musical composition. The selection condition display information Im2 is the attribute information which the selection condition calculation section 112 sets as the selection condition, and shows, for example, that the musical composition which contains the attribute information of "fast temp", "16 beat", and/or "female vocalist" is set as the selection target. Further, the play list display information Im3 is information relating to a selection candidate for a next musical composition onward in the current continuous reproduction, and represents, for example, a next musical composition title "AAA", and musical composition titles "BBB" and "CCC" which are expected to be reproduced thereafter in sequence.

Here, the selection condition display information Im2 displays the selection condition, which is set by the selection condition calculation section 112, on the display section 50, but does not necessarily display anything before the selection condition is set. Alternatively, as the selection condition display information Im2, information, which notifies the user of being in a state that it is before the selection condition is set, may be displayed on the display section 50.

The play list display information Im3 shows the selection candidate for the next musical composition onward even before the selection condition is set, and thus if the selection condition is changed by the skip operation, the play list display information Im3 is also revised in accordance with the change. Further, even if the skip operation is not performed during the reproduction of the musical composition, the selection condition may be calculated based on an assumption that the skip operation is performed at a time point in accordance with a lapse of the reproduction time of the reproduced musical composition, and a selection candidate revised in accordance with the selection condition may be displayed on the display section 50 as the play list display information Im3. For example, when a vocal sound starts to be reproduced in the reproduced musical composition, the selection condition calculation section 112 calculates the selection condition temporarily by assuming that the skip operation is performed at the time point. In the display section 50, the selection candidate based on the temporarily calculated selection condition is displayed as the play list display information Im3. Further, after the reproduction elapsed time of the above-described reproduced musical composition elapses equal to or more than time T1 seconds, the skip operation does not affect the selection condition, and thus the selection condition which causes the user to like the reproduced musical composition is calculated temporarily, and the selection candidate based on the selection condition is displayed on the display section 50 as the play list display information Im3.

The current selection condition is displayed as the selection condition display information in the display section 50, and thus the user can check the displayed selection condition. Therefore, in the case where the user desires to change the selection condition displayed on the display section 50, the selection condition may be changed directly. In this case, based on the selection condition after the change, contents of the play list display information Im2 is also changed, and then displayed on the display section 50.

Further, the reproduced musical composition display information Im1, the selection condition display information Im2, and the play list display information Im3 are not necessarily displayed on the display screen of the display section 50 at the same time. For example, the above-described three pieces of information Im1 to Im3 may be displayed on the display screen of the display section 50, by the user's operation, sequentially in a switching manner.

In this manner, the processing information such as the selection condition is displayed on the display section 50 of the music reproduction device 1, whereby the selection condition currently set by the user can be checked, a part of the selection condition may be corrected as necessary, and the selection condition even preferred by the user can be set. Further, the selection candidate represented by the play list display information Im3 changes constantly according to the reproduction elapsed time of the musical composition, and thus the skip operation is performed at timing when a musical composition which the user desires to listen to is displayed as the selection candidate, thereby setting the selection condition intended by the user further quickly.

SECOND EMBODIMENT

Next, a music reproduction device according to a second embodiment of the present invention will be described. In the above-described first embodiment, the attribute information contained in the musical composition which is assumed to be preferred by the user is set as the selection condition in accordance with the user operation, thereby setting the musical composition containing the attribute information as the selection target. However, there is a case where even the musical composition which contains the attribute information set as the selection condition may also contains, in part, the attribute information which corresponds to a factor which causes the user not to desire to listen. Such musical composition has the attribute information liked by the user and the attribute information not liked in a combined manner, and as a result it may be considered that a musical composition which the user does not desire to listen to will be selected. Therefore, in the second embodiment, based on the attribute information relating to the musical composition with respect to which a skip operation is performed, the musical composition containing the attribute information corresponding to the factor which causes the user not to desire to listen is derived as a non-selection target, the musical composition corresponding to the non-selection target is excluded from the selection target set in the above-described first embodiment, and then the selection condition is set.

The music reproduction device according to the second embodiment is different from the music reproduction device 1 according to the first embodiment, only in the action of deriving the selection condition (see FIG. 3) and the information displayed on the display section 50 (see FIG. 10). Therefore, since the constitution of the music reproduction device according to the second embodiment is the same as that of the first embodiment as described with reference to FIG. 1, common reference numbers are respectively provided to common components, and a detail description will be omitted. Further, an action of continuous reproduction performed by the music reproduction device according to the second embodiment is the same as that according to the first embodiment as described with reference to FIG. 2, and thus a detail description thereof will be omitted.

Figure 11:
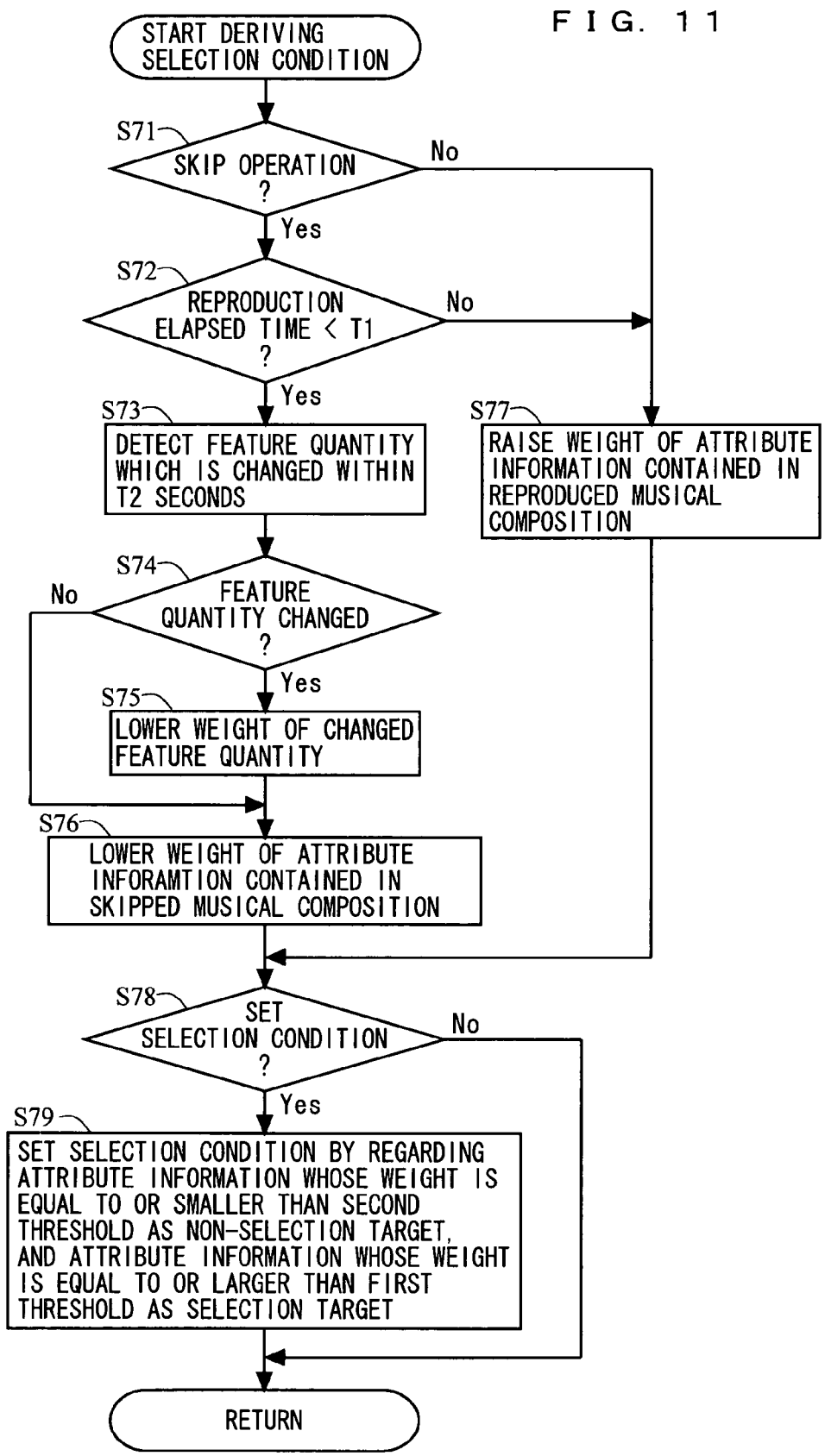
FIG. 11 is a subroutine showing details of an action of deriving the selection condition, in step S15 of FIG. 2, according to the second embodiment of the present invention.

FIG. 11 is a subroutine showing details of the action of deriving the selection condition in step S15 of FIG. 2 performed in the second embodiment of the present invention. Note that actions of steps S71 to S77 shown in FIG. 11 are the same as the actions of the above-described steps S31 to S37, which are described with reference to FIG. 3, and thus detail descriptions thereof will be omitted. That is, in the second embodiment, in the case where there is a feature level which has changed within time T2 seconds before a time point of the skip operation, the music reproduction device 1 determines that the changed feature level corresponds to a major factor which causes the user not to desire to listen, and consequently lowers a weighting factor set to the feature level. Further, with regard to other attribute information contained in the musical composition with respect to which the skip operation is performed, it is determined that a factor, which causes the user not to desire to listen, is contained therein, thereby lowering the weighting factor, which is set to the attribute information contained in the musical composition with respect to which the skip operation is performed. On the other hand, in the case where the skip operation is not performed during reproduction of the musical composition, or in the case where reproduction elapsed time at the time point of the skip operation is equal to or more than time T1 seconds, it is determined that the user is satisfied with the selected musical composition, and thus the weighting factor set to the attribute information contained in the musical composition is raised.

In step S78, the selection condition calculation section 112 determines whether or not the selection condition is to be set. Here, it is also thought that only by increasing/decreasing the weighting factor which is set, based on the reproduction of only one musical composition, to the attribute information, clear difference in the weighting factor will not be seen. Therefore, as an example, the selection condition calculation section 112 reproduces a plurality of predetermined musical compositions at random (steps S13 and S14), repeats the actions of the above-described steps S71 to S77, and sets the selection condition. As another example, the selection condition calculation section 112 repeats the actions of the above-described steps S71 to S77 until at least one of the weighting factors set to the attribute information becomes equal to or exceeds a first threshold to be described hereinbelow, and/or at least one of the weighting factors becomes equal to or drop to below a second threshold to be described hereinbelow, and then sets the selection condition. Here, the first threshold>the second threshold is satisfied. The selection condition calculation section 112 forwards, in the case of setting the selection condition, processing to next step S79, and terminates, in the case of not yet setting the selection condition, the processing based on the subroutine and returns to above-described step S12 to repeat the processing.

In step S79, the selection condition calculation section 112 sets data of a musical composition containing the attribute information whose weighting factor become equal to or exceeds the first threshold as a condition of a musical composition which user desires to listen to, that is a selection target. Further, the selection condition calculation section 112 sets data of a musical composition containing the attribute information whose weighting factor become equal to or drops to below the second threshold as a condition of a musical composition which the user does not desire to listen to, that is a non-selection target. And the selection condition calculation section 112 sets the selection condition such that the musical compositions are selected by subtracting the non-selection target from the selection target. That is, the selection condition calculation section 112 sets a condition where the attribute information whose weighting factor is equal to or more than the first threshold is included, and the attribute information whose weighting factor is equal to or less the second threshold is not included as the selection condition. Further, the selection condition calculation section 112 terminates the processing based on the subroutine, returns to above-descried step S12, and then repeats the processing. In this manner, after increasing/decreasing processing of the weighting factor is repeated with respect to a plurality of the musical compositions selected at random, the selection condition is derived, where the attribute information whose weighting factor is equal to or more than the first threshold is regarded as the condition of the musical composition which user desires to listen to, and the attribute information whose weighting factor is equal to or less than the second threshold is regarded as the condition of the musical composition which user does not desire to listen to. Note that even if the weighting factor is less than the above-described first threshold, the top several pieces of the attribute information whose weighting factors are relatively large may be selected as the selection target. Further, even if the weighting factors are more than the above-described second threshold, bottom several pieces of the attribute information whose weighting factors are relatively small may be set as the non-selection target.

For example, suppose that the weighting factors are set to the attribute information as shown in FIG. 7 by repeating the above-described increase/decrease of the weighting factors. The above-described first threshold is set at "15", and the above-described second threshold is set at "10". In this case, the attribute information whose weighting factor is equal to or less than the second threshold "10", that is, a musical composition containing "2 beat" or "4 beat" will be the non-selection target. Further, the attribute information whose weighting factor is equal to or more than the first threshold "15", that is, a musical composition containing the "fast tempo" and/or "female vocalist" will be the selection target. And then the musical composition which is the selection target and which is not the non-selection target will be selected. Accordingly, from the musical compositions containing "fast tempo" and/or "female vocalist" as the attribute information, which correspond to the selection target, the musical compositions containing "2 beat" or "4 beat" as the attribution information, which correspond to the non-selection target, are subtracted, whereby a selection is performed.

In this manner, the music reproduction device according to the present embodiment can specify, based only on the skip operation, the attribute information of the musical composition which the user does not desire to listen to, thereby reproducing only the musical composition which the user desires to listen to by setting the musical composition which contains such attribution information as non-selection target.

Figure 12:
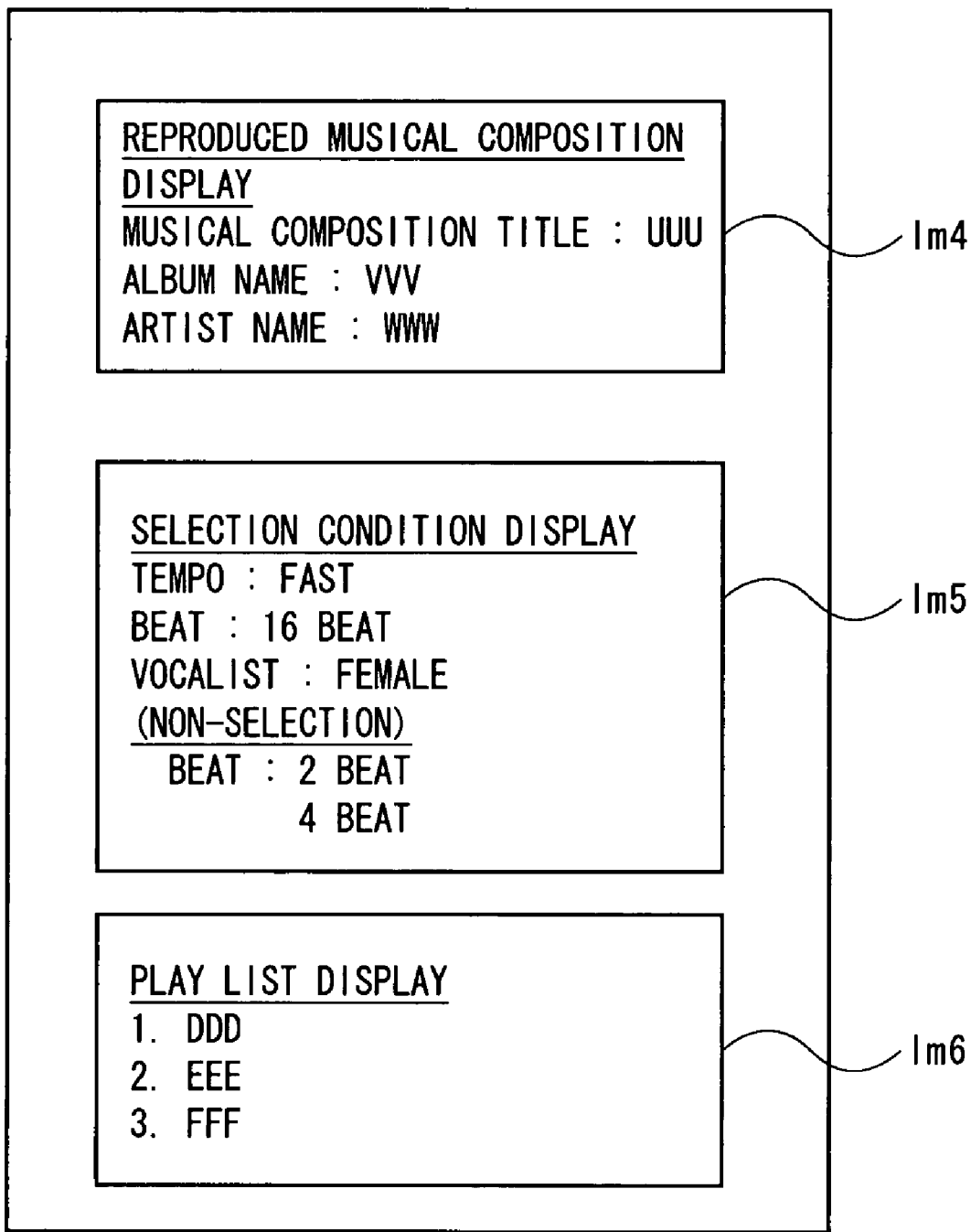
FIG. 12 is a diagram showing an example of information displayed on a display screen of a display section 50 according to the second embodiment of the present invention.

In FIG. 12, during the continuous reproduction after setting the above-described selection condition, reproduced musical composition display information Im4, selection condition display information Im5, and play list display information Im6 are displayed on the display screen of the display section 50 based on a control of the display control section 17. The reproduced musical composition display information Im4 is information relating to the musical composition which the music reproduction device 1 is currently reproducing, and represents, for example, a musical composition title (UUU) of the reproduced musical composition, an album name (VVV) containing the reproduced musical composition, and an artist name (WWW) of the reproduced musical composition. The selection condition display information Im5 is the attribute information which the selection condition calculation section 112 sets as the selection condition, and shows, for example, that the musical composition which contains "fast tempo", "16 beat", and/or "female vocalist" as the attribute information is the selection target, and that the musical composition which contains "2 beat" or "4 beat" as attribute information is the non-selection target. Further, the play list display information Im6 is information relating to a selection candidate for a next musical composition onward in the current continuous reproduction, and represents, for example, the next musical composition title "DDD", and the musical composition title "EEE" and "FFF" which are expected to reproduced thereafter in sequence.

Here, the selection condition display information Im5 displays the selection condition, which is set by the selection condition calculation section 112, on the display section 50, but does not necessarily display anything before the selection condition is set. Alternatively, as the selection condition display information Im2, information, which notifies the user of being in a state that it is before the selection condition is set, may be displayed on the display section 50.

The play list display information Im6 shows the selection candidate for the next musical composition onward even before the setting of the selection condition, and thus if the selection condition defined by the non-selection target and the selection target is changed by the skip operation, the play list display information Im6 is also revised in accordance with the change. Further, even if the skip operation is not performed during the reproduction of the musical composition, the non-selection target may be calculated based on an assumption that the skip operation is performed at a time point in accordance with a lapse of the reproduction time of the reproduced musical composition, and the selection candidate revised in accordance with the non-selection target may be displayed on the display section 50 as the play list display information Im6. For example, when a vocal sound starts to be reproduced in the reproduced musical composition, the selection condition calculation section 112 temporarily calculates the non-selection target by assuming that the skip operation is performed at the time point. In the display section 50, the selection candidate based on the selection condition temporarily calculated is displayed as the play list display information Im6. Further, after the reproduction elapsed time of the above-described reproduced musical composition elapses equal to or more than time T1 seconds, the skip operation does not affect the selection condition, and thus the selection condition which causes the user to like the reproduced musical composition is temporarily calculated, and then the selection candidate based on the selection condition is displayed on the display section 50 as the play list display information Im6.

The current selection condition is displayed as the selection condition display information Im5 in the display section 50, and thus the user can check the displayed selection condition. Therefore, in the case where the user desires to change the selection condition containing the non-selection target displayed on the display section 50, the selection condition may be changed directly. In this case, based on the selection condition after the change, contents of the play list display information Im6 is also changed, and then displayed on the display section 50.

Further, the reproduced musical composition display information Im4, the selection condition display information Im5, and the play list display information Im6 are not necessarily displayed non the display screen of the display section 50 at the same time. For example, the above-described three pieces of information Im4 to Im6 may be displayed on the display screen of the display section 50, by the user's operation, sequentially in a switching manner.

In this manner, the processing information such as the selection condition including non-selection target is displayed on the display section 50 of the music reproduction device 1, whereby the selection condition currently set by the user can be checked, a part of the selection condition may be corrected as necessary, and the selection condition even preferred by the user can be set. Further, selection candidate represented by the play list display information Im6 changes constantly according to the reproduction elapsed time of the musical composition, and thus the skip operation is performed at timing when a musical composition which the user desires to listen to is displayed as the selection candidate, thereby setting the selection condition intended by the user further quickly.

Note that in the above-described first and second embodiments, examples of the prevent invention realized by the music reproduction devices having the constitution shown in FIG. 1 are described, but the present invention can be realized by a different embodiment. For example, a storage medium which stores a music reproduction program enabling a computer to execute the actions (steps) described in the above first and second embodiments may be applied. In this case, a general computer system is caused to execute the music reproduction program stored in the above-described storage medium, whereby the computer system can be realized as the music reproduction device. The above-described music reproduction program may be stored previously on a nonvolatile memory accommodated in the computer system. Further, an information storage medium for recoding the above-described music reproduction program can be realized by an optical disc storage medium such as a CD-ROM, a DVD, and the like, and a memory device such as a nonvolatile semiconductor memory. Further, the above-described music reproduction program may not only be provided to the computer system via an external memory device, but may be provided to the computer system via a wired or wireless communication line.

While the present invention has been described in detail, the above-described description is, in all aspects, illustrative and not restrictive. It is understood that numerous other modifications and variations can be devised without departing from the scope of the invention.

INDUSTRIAL APPLICABILITY

A music reproduction device, a method, a program, and a storage medium having the program stored thereon and an integrated circuit according to the present invention is operable to set a selection condition in accordance with a user's simple operation, and thus useful for a device and the like which performs a selection from a plurality of musical compositions stored thereon.

The invention claimed is:

1. A music reproduction device for reproducing data of a musical composition selected from a plurality of musical compositions, the music reproduction device comprising:
   a musical composition data storage section that stores data of the plurality of the musical compositions;
   an attribute information storage section that stores attribute information, which is information relating to the data of the musical composition, for each of the data of the plurality of the musical compositions which are stored on said musical composition data storage section;
   a reproduction section that reproduces the data of the musical composition stored on said musical composition data storage section;
   an operational information obtaining section that obtains operational information corresponding to a user's operation which represents an instruction on an action of said reproducing section;
   a control section that selects the data of the musical composition to be reproduced by said reproducing section; and
   a clock section that measures an elapsed time from a reproduction start time at which said reproduction section reproduces the data of the musical composition,
   wherein said control section includes a selection condition calculation section which changes relative merits of the attribute information relating to the data of the musical composition in accordance with details of the operational information obtained by said operational information obtaining section during the data of the musical composition being reproduced by said reproducing section, and then calculates, based on the relative merits of the attribute information, a condition that selects the data of the musical composition to be reproduced by said reproducing section, and
   said selection condition calculation section changes, when said operational information obtaining section obtains the operational information during the data of the musical composition being reproduced by said reproduction section, the relative merits of the attribute information relating to the data of the musical composition in accordance with the details of the operational information and the elapsed time when the operational information is obtained.

2. The music reproduction device according to claim 1, wherein said selection condition calculation section changes, when said operational information obtaining section obtains the operational information during the data of the musical composition being reproduced by said reproduction section, the relative merits of the attribute information relating to the data of the musical composition in accordance with a feature level which has changed immediately before an obtaining time of the operational information during the data of the musical composition being reproduced.

3. The musical reproduction device according to claim 2 wherein said selection condition calculation section changes, in the case where when said operational information obtaining section obtains the operational information during the data of the musical composition being reproduced by said reproduction section, the obtaining time of the operational information during the data of the musical composition being reproduced is within a predetermined time from the reproduction start time of the data of the musical composition, the relative merits of the attribute information relating to the data of the musical composition in accordance with the feature level which has changed immediately before the obtaining time of the operational information.

4. A music reproduction device for reproducing data of a musical composition selected from a plurality of musical compositions, the music reproduction device comprising:
   a musical composition data storage section that stores data of the plurality of the musical compositions;
   an attribute information storage section that stores attribute information, which is information relating to the data of the musical composition, for each of the data of the plurality of the musical compositions which are stored on said musical composition data storage section;
   a reproduction section that reproduces the data of the musical composition stored on said musical composition data storage section;
   an operational information obtaining section that obtains operational information corresponding to the user's operation which represents an instruction on an action of said reproducing section; and
   a control section that selects the data of the musical composition to be reproduced by said reproducing section,
   wherein said control section includes a selection condition calculation section which changes relative merits of the attribute information relating to the data of the musical composition in accordance with details of the operational information obtained by said operation information obtaining section during the data of the musical composition being reproduced by said reproducing section, and then calculates, based on the relative merits of the musical composition to the reproduced by said reproducing section,
   said selection condition calculation section includes a weighting factor setting section for setting a weighting factor which numerically represents the relative merits of the attribute information and for managing the relative merits of the attribute information, and
   said selection condition calculation section calculates the condition by regarding the data of the musical composition having the attribute information, whose weighting factor set by said weighting factor setting section is equal to or more than a first threshold, stored on said attribute information storage section, as a selection target to be reproduced by said reproduction section.

5. The music reproduction device according to claim 4, wherein said selection condition calculation section calculates the condition by regarding the data of the musical composition having the attribute information, whose weighting factor set by said weighting factor setting section is equal to or more than the first threshold, stored in said attribute information storage section, as the selection target to be reproduced by said reproduction section, and regarding the data of the musical composition having the attribute information, whose weighting factor set by said weighting factor setting section is equal to or less than a second threshold which is less than the first threshold, stored in said attribute information storage section as a non-selection target not to be reproduced by said reproduction section.

6. The music reproduction device according to claim 4, wherein, in the case where the operational information obtained by said operational information obtaining section is an instruction of skipping the data of the musical composition being reproduced by said reproduction section, said selection condition calculation section lowers the weighting factor set, with respect to the attribute information relating to the data of the musical composition, by said weighting factor setting section.

7. The music reproduction device according to claim 4 wherein, in the case where said operational information obtaining section does not obtain the operational information during the data of the musical composition being reproduced by said reproduction section, or in the case where an obtaining time of the operational information during the data of the musical composition being reproduced exceeds a predetermined time from a reproduction start time of the data of the musical composition, said selection condition calculation section raises the weighting factor set, with respect to the attribute information relating to the data of the musical composition, by said weighting factor setting section.

8. A music reproduction device for reproducing data of a musical composition selected from a plurality of musical compositions, the music reproduction device comprising;
   a musical composition data storage section that stores data of the plurality of the musical compositions;
   an attribute information storage section that stores attribute information, which is information relating to the data of the musical composition, for each of the data of the plurality of the musical compositions which are stored on said musical composition data storage section;
   a reproduction section that reproduces the data of the musical composition stored on said musical composition data storage section;
   an operational information obtaining section that obtains operational information corresponding to a user's operation which represents an instruction on an action of said reproducing section; and
   a control section that selects the data of the musical composition to be reproduced by said reproducing section,
   wherein said control section includes a selection condition calculation section which changes relative merits of the attribute information relating to the data of the musical composition in accordance with details of the operational information obtained by said operational information obtaining section during the data of the musical composition being reproduced by said reproducing section, and then calculates, based on the relative merits of the attribute information, a condition for selecting the data of the musical composition to be reproduced by said reproducing section, and said control section further includes a resetting determining section for providing, in the case where said reproduction section is sequentially reproducing the data of the musical composition selected based on the condition calculated by said selection condition calculation section, and a ratio of a number of the musical compositions which have obtained the operational information during the reproduction to a number of reproduced musical compositions is equal to or more than a predetermined ratio, an instruction of calculating the condition again to said selection condition calculation section.

9. The music reproduction device according to claim 1, wherein the attribute information comprises: at least one musical feature level selected from a group of a tempo, a beat, tonality, a musical composition structure, a chord, tone quality, and a note number of the musical composition; at least one physical feature level selected from a group of a frequency of the musical composition, a music signal power level, and voice quality of a vocalist; mapping information derived by using the musical feature level, the physical feature level, and a mapping function; and at least one piece of bibliographic information selected from a group of an artist name, a musical composition title, a category name, lyrics, time of creation, a label, an adaptor, a composer, and a lyric writer.

10. The music reproduction device according to claim 1 further comprising a display control section for displaying information on a display screen,
   wherein said display control section displays, on the display screen, musical composition information which represents the data of the musical composition being reproduced by said reproduction section, selection condition information which represents a selection condition calculated by said selection condition calculation section, and play list information which represents the data of the musical composition expected to be selected based on the selection condition, and
   the play list information is revised each time said selection condition calculation section calculates the selection condition.

11. A music reproduction method for reproducing data of a musical composition selected from a plurality of musical compositions stored on a storage section, the music reproduction method comprising:
   an attribute information storing step of storing attribute information, which is information relating to the data of the musical composition, for each of the data of the plurality of the musical compositions stored on the storage section;
   a reproducing step of reproducing the data of the musical composition stored on the storage section;
   an operational information obtaining step of obtaining operational information corresponding to a user's operation which represents an instruction on an action of the reproducing step;
   a controlling step of selecting the data of the musical composition to be reproduced by the reproducing step, and
   a clocking step of measuring an elapsed time from a reproduction start time at which the reproducing step reproduces the data of the musical composition,
   wherein the controlling step includes a selection condition calculation step which changes relative merits of the attribute information relating to the data of the musical composition in accordance with details of the operational information obtained by the operational information obtaining step during the data of the musical composition being reproduced by the reproducing step, and then calculates, based on the relative merits of the attribute information, a condition for selecting the data of the musical composition to be reproduced by the reproduction step, and the selection condition calculation step changes, when the operational information obtaining step obtains the operation information during the data of the musical composition being reproduced by the reproducing step, the relative merits of the attribute information relating to the data of the musical composition in accordance with the details of the operation information and the elapsed time when the operation information is obtained.

12. A storage medium having stored thereon a music reproduction program executable by a computer of a device for reproducing data of a musical composition selected from a plurality of musical compositions stored on a storage section, the storage medium having the music reproduction program stored thereon causing the computer to execute:

an attribute information storing step of storing attribute information, which is information relating to the data of the musical composition, on each of data of the plurality of the musical compositions stored on the storage section;

a reproducing step of reproducing the data of the musical composition stored on the storage section;

an operational information obtaining step of obtaining operational information corresponding to a user's operation which represents an instruction on an action of the reproducing step;

a controlling step of selecting the data of the musical composition to be reproduced by the reproducing step; and a clocking step of measuring an elapsed time from a reproduction start time at which the reproducing step reproduces the data of the musical composition, wherein the controlling step includes a selection condition calculation step which changes relative merits of the attribute information relating to the data of the musical composition in accordance with details of the operational information obtained by the operational information obtaining step during the data of the musical composition being reproduced by the reproducing step, and then calculates, based on the relative merits of the attribute information, a condition for selecting the data of the musical composition to be reproduced by the reproducing step, and the selection condition calculation step changes, when the operational information obtaining step obtains the operational information during the data of the musical composition being reproduced by the reproducing step, the relative merits of the attribute information relating to the data of the musical composition in accordance with the details of the operational information and the elapsed time when the operational information is obtained.

13. An integrated circuit which is used in a music reproduction device including a musical composition data storage section for storing data of a plurality of musical compositions, and an attribute information storage section for storing attribute information, which is information relating to data of a musical composition, for each of the data of the plurality of the musical compositions stored on the musical composition data storage section, the integrated circuit comprising:

a reproduction section that reproduces the data of the musical composition stored on the musical composition data storage section;

an operational information obtaining section that obtains operational information corresponding to a user's operation which represents an instruction on an action of said reproduction section;

a control section that selects the data of the musical composition to be reproduced by said reproduction section; and a clock section that measures an elapsed time from a reproduction start time at which said reproduction section reproduces the data of the musical composition, said control section includes a selection condition calculation section which changes relative merits of the attribute information relating to the data of the musical composition in accordance with details of the operational information obtained by said operational information obtaining section during the data of the musical composition being reproduced by said reproduction section, and then calculates, based on the relative merits of the attribute information, a condition for selecting the data of the musical composition to be reproduced by said reproduction section, and said selection condition calculation section changes, when said operational information obtaining section obtains the operational information during the data of said musical composition being reproduced by said reproduction section, the relative merits of the attribute information relating to the data of the musical composition in accordance with the details of the operational information and the elapsed time when the operational information is obtained.

* * * * *